United States Patent
Horng et al.

(10) Patent No.: US 8,030,809 B2
(45) Date of Patent: Oct. 4, 2011

(54) STATOR AND DC BRUSHLESS MOTORS INCLUDING THE STATOR

(75) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 69 days.

(21) Appl. No.: 12/502,264

(22) Filed: Jul. 14, 2009

(65) Prior Publication Data

US 2011/0012444 A1     Jan. 20, 2011

(51) Int. Cl.
*H02K 1/04* (2006.01)

(52) U.S. Cl. .......................................................... 310/43

(58) Field of Classification Search ................... 310/43, 310/254.1, 216.105, 216.115
See application file for complete search history.

(56) References Cited

U.S. PATENT DOCUMENTS

| 5,465,020 | A | * | 11/1995 | Peterson | 310/194 |
| 5,917,262 | A | | 6/1999 | Huang et al. | |
| 5,952,760 | A | | 9/1999 | Miyazawa et al. | |
| 6,400,053 | B1 | | 6/2002 | Horng | |
| 7,687,959 | B1 | * | 3/2010 | Lee | 310/166 |

* cited by examiner

*Primary Examiner* — Nguyen N Hanh
(74) *Attorney, Agent, or Firm* — Alan Kamrath; Kamrath & Associates PA

(57) ABSTRACT

A stator for a DC brushless motor includes an annular insulating ring integrally formed from an insulating material. The annular insulating ring includes an outer peripheral face and an inner peripheral face. A plurality of winding portions extends from at least one of the outer and inner peripheral faces. A coil unit is wound around each of the plurality of winding portions. The stator can be utilized in various DC brushless motors. Since the stator does not include conventional silicon steel plates and is comprised of an annular insulating ring and a coil unit, advantages including low manufacturing costs, assembling convenience, possible reduction in the axial height, and high rotational stability are obtained.

55 Claims, 19 Drawing Sheets

STATOR AND DC BRUSHLESS MOTORS INCLUDING THE STATOR

BACKGROUND OF THE INVENTION

1. Field of the Invention

The present invention relates to a stator and DC brushless motors including the stator and, more particularly, to a stator without silicon steel plates and DC brushless motors including the stator.

2. Description of the Related Art

Currently available DC brushless motors include an outer rotor type and an inner rotor type. Outer rotor type motors have advantages of simple structure, good heat dissipation, and low costs, whereas inner rotor type motors have better rotational stability.

FIGS. 1 and 2 show a conventional outer rotor type motor 8 including a base 81, a stator 82, and a rotor 83. The base 81 includes a shaft tube 811. The stator 82 is mounted to an outer periphery of the shaft tube 811. The rotor 83 includes a permanent magnet 831 and is rotatably extended through the shaft tube 811. More specifically, the stator 82 of the motor 8 includes a plurality of silicon steel plates 821, an upper insulating sleeve 822, a lower insulating sleeve 823, and a coil unit 824. The silicon steel plates 821 are stacked up and engaged with each other as a single member. The upper and lower insulating sleeves 822 and 823 are coupled to two ends of the stacked silicon steel plates 821. The coil unit 824 is wound around the silicon steel plates 821 and the upper and lower insulating sleeves 822 and 823 at predetermined portions.

The silicon steel plates 821 are formed by pressing and then stacking one upon another. Next, the upper and lower insulating sleeves 822 and 823 are respectively coupled to the ends of the stacked silicon steel plates 821 before winding the coil unit 824. The stator 82 has many components and, thus, a complicated structure, resulting in high manufacturing costs and assembling inconvenience. Furthermore, the axial height of the stator 82 is relatively large, such that the overall volume and the overall axial height of the outer rotor type motor 8 can not be effectively reduced. As a result, miniaturization of the outer rotor type motor 8 is almost impossible. Further, the permanent magnet 831 of the rotor 83 includes a plurality of alternately disposed north poles and south poles. Torque change or uneven torque (also known as cogging torque) occurs when the north and south poles of the permanent magnet 831 move relative to magnetic pole faces formed by the silicon steel plates 821 of the stator 82. Vibration easily occurs especially when the rotor 83 rotates at low speeds.

FIGS. 3 and 4 show an inner rotor type motor 9 including a housing 91, a stator 92, a rotor 93, and a permanent magnet 94. The housing 91 is hollow and receives the stator 92. The rotor 93 includes a shaft 931 rotatably received in the housing 91 and extending through the stator 92. The stator 92 interacts with the permanent magnet 94 to drive the rotor 93 to rotate. The stator 92 of the inner rotor type motor 9 also includes a plurality of silicon steel plates 921, upper and lower insulating sleeves 922 and 923, and a coil unit 924. The stator 92 of the inner rotor type motor 9 is substantially the same as the stator 82 of the outer rotor type motor 8 and, thus, has the same disadvantages including high manufacturing costs, assembling inconvenience, difficulties in reducing the axial height, and low rotational stability.

SUMMARY OF THE INVENTION

The primary objective of the present invention is to provide a DC brushless motor to solve the disadvantages of conventional inner and outer rotor type motors including high manufacturing costs, assembling inconvenience, difficulties in reducing the axial height, and low rotational stability.

Another objective of the present invention is to provide a stator for a DC brushless motor without silicon steel plates, so that the stator can be utilized in inner and outer rotor type motors.

A stator for a DC brushless motor according to the preferred teachings of the present invention includes an annular insulating ring integrally formed from an insulating material. The annular insulating ring includes an outer peripheral face and an inner peripheral face. A plurality of winding portions extends from at least one of the outer and inner peripheral faces. A coil unit is wound around each of the plurality of winding portions.

The stator can be utilized in various DC brushless motors.

In a first aspect, a DC brushless motor includes a base having a pivotal portion. A circuit board is mounted to the base. A stator includes an annular insulating ring and a coil unit. The annular insulating ring includes an outer peripheral face and an inner peripheral face. A plurality of winding portions extends from the outer peripheral face. The inner peripheral face surrounds the pivotal portion. The coil unit is wound around each of the plurality of winding portions and electrically connected to the circuit board. A rotor includes a hub and a permanent magnet. The hub includes a shaft rotatably coupled to the pivotal portion. The permanent magnet is mounted to the hub and surrounds the outer peripheral face of the annular insulating ring. The permanent magnet has a magnet face facing the coil unit.

In a second aspect, a DC brushless motor includes a housing having at least one pivotal portion. A stator is mounted in the housing and includes an annular insulating ring and a coil unit. The annular insulating ring includes an outer peripheral face and an inner peripheral face. The outer peripheral face faces an inner periphery of the housing. A plurality of winding portions extends from the inner peripheral face. The coil unit is wound around each of the plurality of winding portions and electrically connected to a circuit board. A rotor includes a hub and a permanent magnet. The hub includes a shaft rotatably coupled to the at least one pivotal portion. The permanent magnet is mounted to the hub. The permanent magnet is surrounded by the inner peripheral face of the annular insulating ring and has a magnet face facing the coil unit.

In a third aspect, a DC brushless motor includes a base having a pivotal portion. A circuit board is mounted to the base. A stator includes an annular insulating ring and a coil unit. The annular insulating ring includes an outer peripheral face and an inner peripheral face. A plurality of winding portions extends from each of the inner and outer peripheral faces. The inner peripheral face surrounds the pivotal portion. The coil unit is wound around each of the plurality of winding portions and electrically connected to the circuit board. A rotor includes a hub and a permanent magnet. The hub includes a shaft rotatably coupled to the pivotal portion. The permanent magnet is mounted to the hub and surrounds the outer peripheral face of the annular insulating ring. The permanent magnet has a magnet face facing the coil unit.

In a fourth aspect, a DC brushless motor includes a housing having at least one pivotal portion. A stator is mounted in the housing and includes an annular insulating ring and a coil unit. The annular insulating ring includes an outer peripheral face and an inner peripheral face. A plurality of winding portions extends from each of the outer and inner peripheral faces. The outer peripheral face faces an inner periphery of the housing. The coil unit wound is around each of the plurality of winding portions and electrically connected to a circuit board. A rotor includes a hub and a permanent magnet. The hub includes a shaft rotatably coupled to the at least one pivotal portion. The permanent magnet is mounted to the hub. The permanent magnet is surrounded by the inner peripheral face of the annular insulating ring and has a magnet face facing the coil unit.

In a fifth aspect, a DC brushless motor includes a base having a pivotal portion. A circuit board is mounted to the base. A stator includes an annular insulating ring and a coil unit. The annular insulating ring includes an outer peripheral face and an inner peripheral face. A plurality of winding portions extends from each of the outer and inner peripheral faces. The inner peripheral face surrounds the pivotal portion. An annular groove is formed between the outer and inner peripheral faces and has an opening. The coil unit is wound around each of the plurality of winding portions and electrically connected to the circuit board. A rotor includes a hub and a permanent magnet. The hub includes a shaft rotatably coupled to the pivotal portion. The permanent magnet is mounted to the hub and extends into the annular groove via the opening. The permanent magnet has a magnet face facing the coil unit.

Since the stator according to the preferred teachings of the present invention does not include conventional silicon steel plates and is comprised of an annular insulating ring and a coil unit, advantages including low manufacturing costs, assembling convenience, possible reduction in the axial height, and high rotational stability are obtained.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
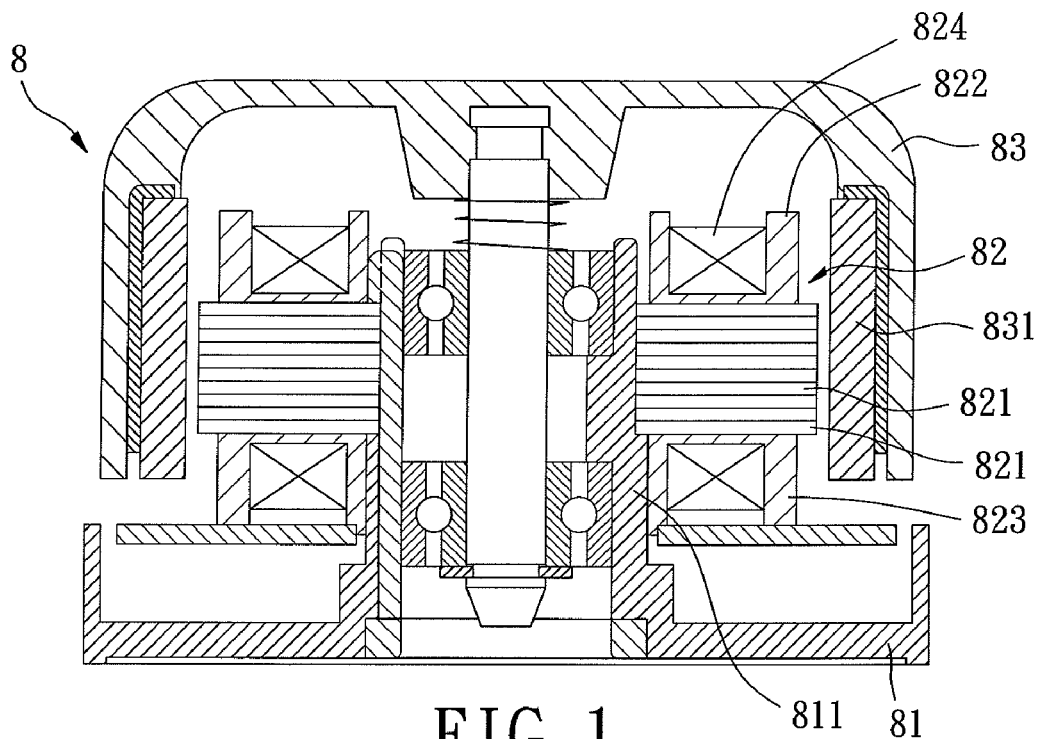
FIG. 1 shows a cross sectional view of a conventional outer rotor type motor.
Figure 2:
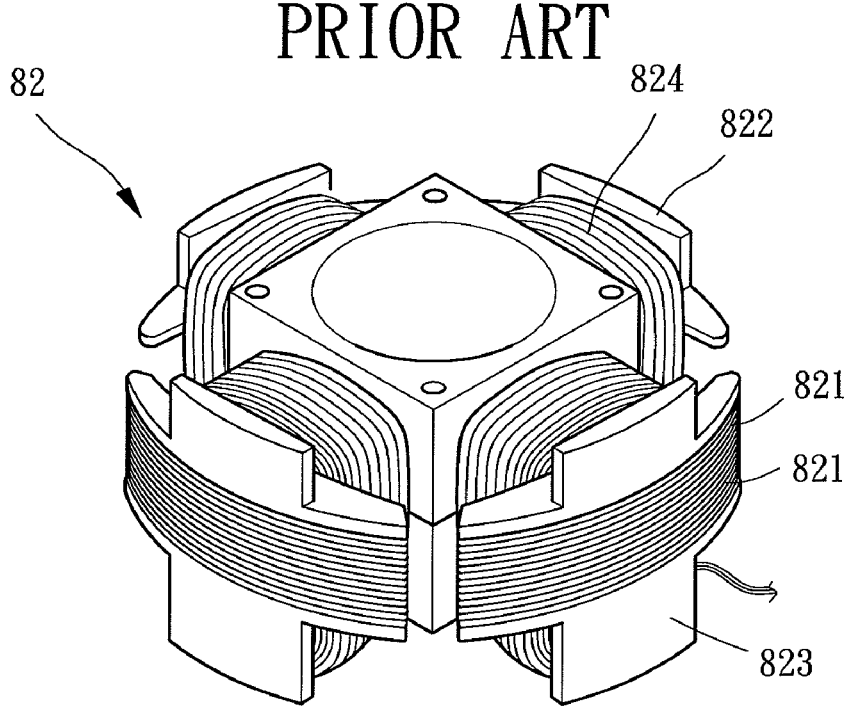
FIG. 2 shows a perspective view of a stator of the motor of FIG. 1.
Figure 3:
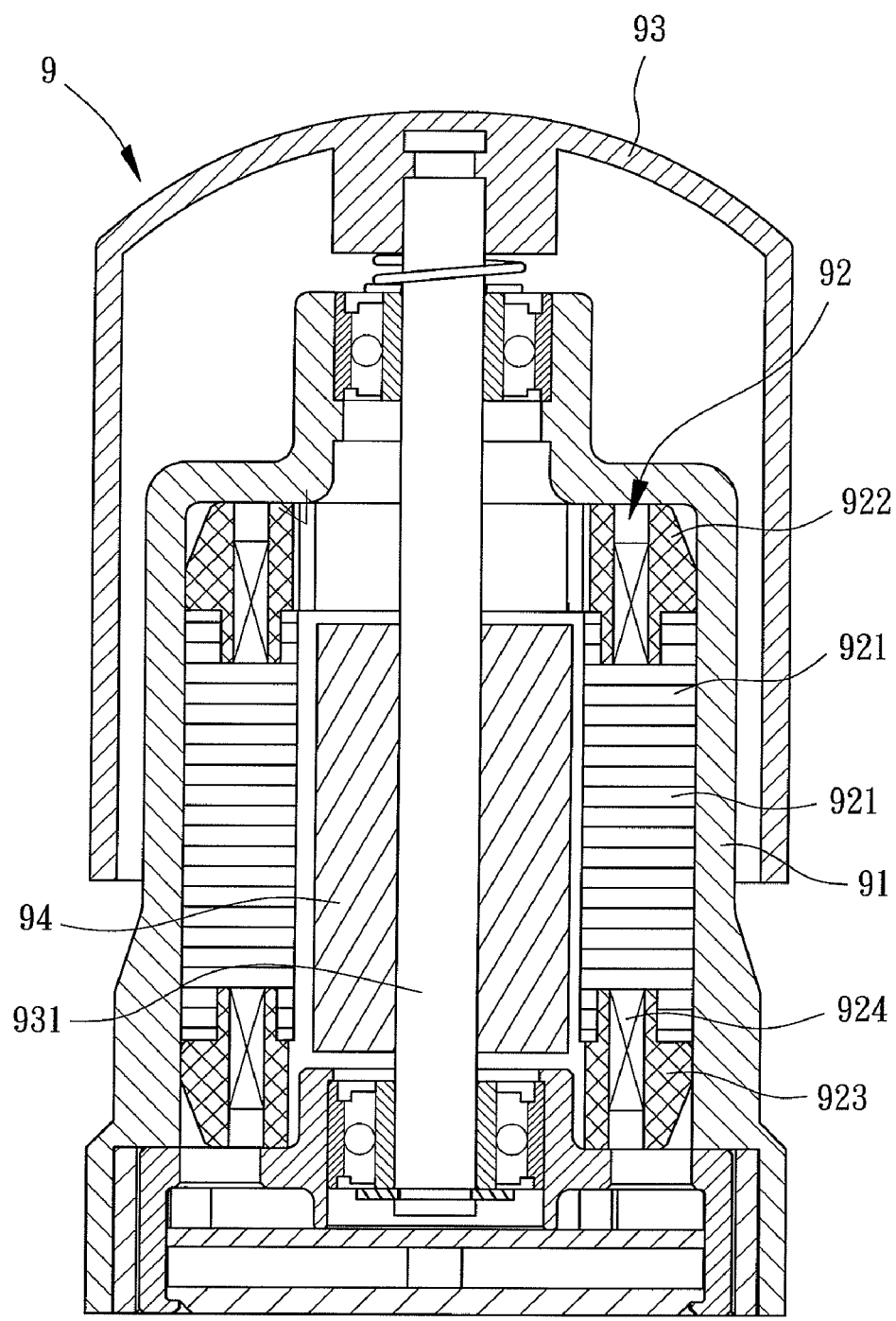
FIG. 3 shows a cross sectional view of a conventional inner rotor type motor.
Figure 4:
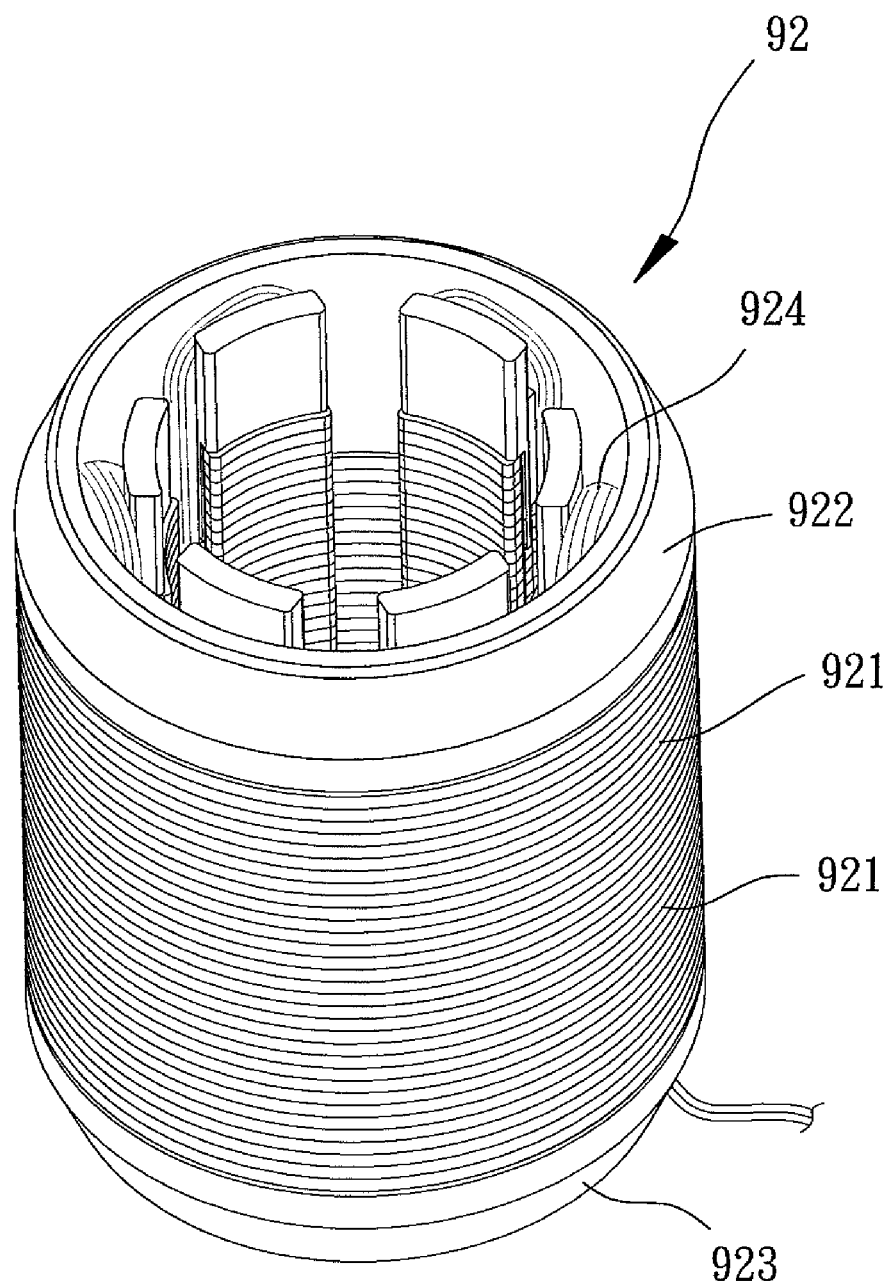
FIG. 4 shows a perspective view of a stator of the motor of FIG. 3.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "end", "portion", "section", "axial", "annular", "spacing", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 5:
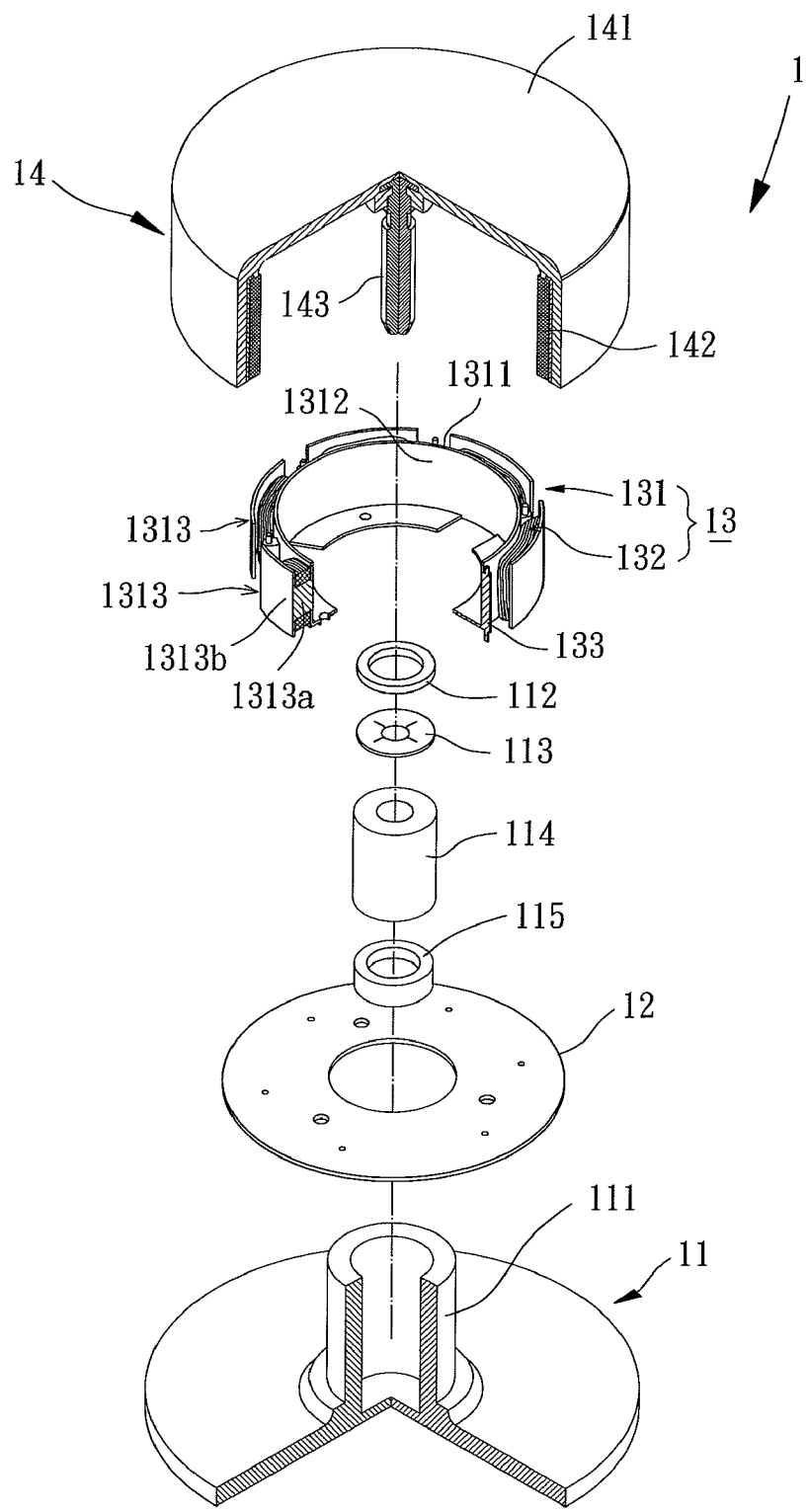
FIG. 5 shows an exploded, perspective view of a DC brushless motor of a first embodiment according to the preferred teachings of the present invention.
Figure 6:
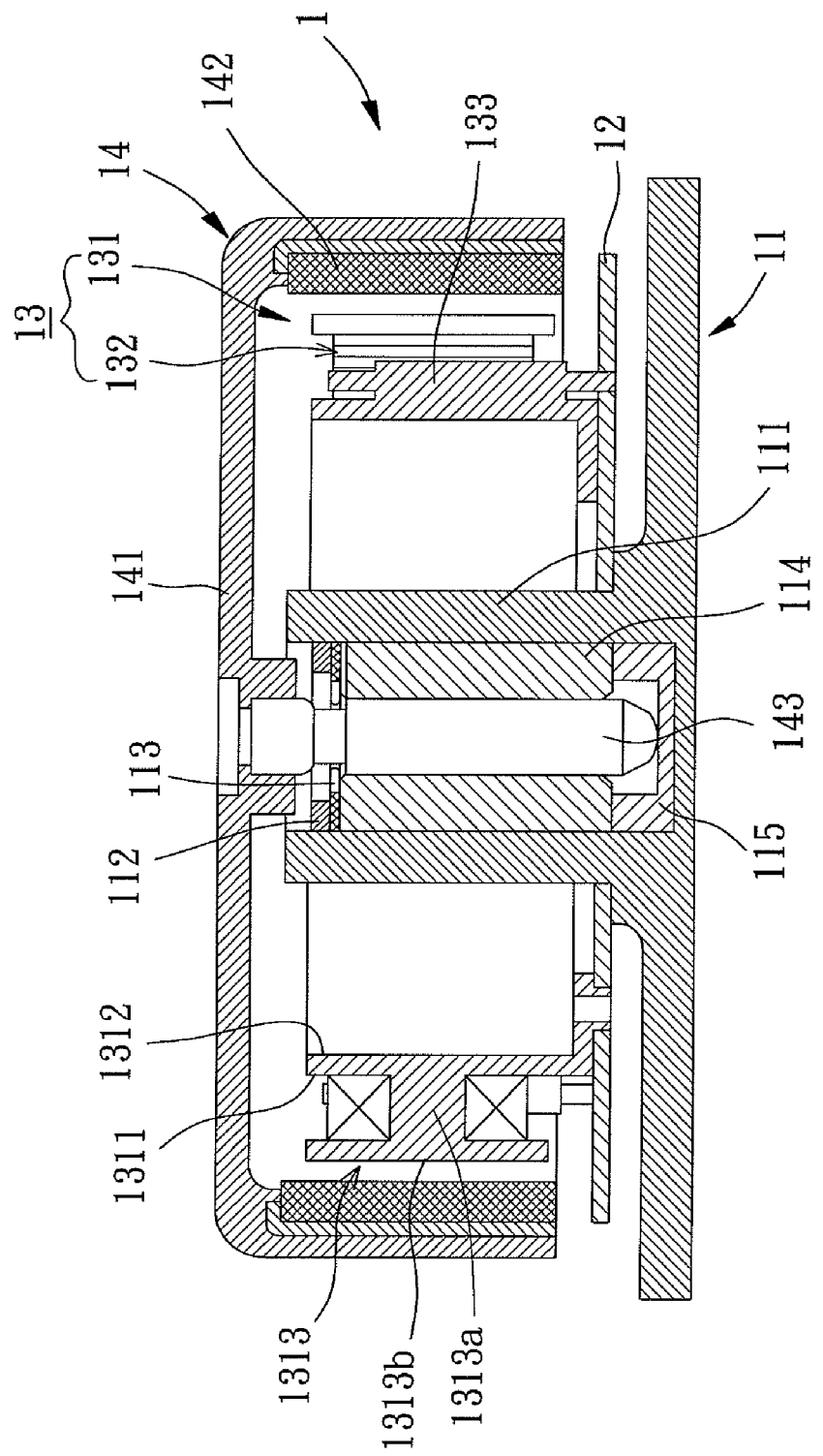
FIG. 6 shows a cross sectional view of the DC brushless motor of FIG. 5.

FIGS. 5 and 6 show a DC brushless motor 1 of a first embodiment according to the preferred teachings of the present invention. The DC brushless motor 1 is of outer rotor type and includes a base 11, a circuit board 12, a stator 13, and a rotor 14. The base 11 includes a pivotal portion 111 in the form of a shaft tube receiving elements such as a fixing ring 112, a retaining plate 113, a bearing 114, and an abrasion-resistant plate 115, so that the rotor 14 can rotate smoothly in the pivotal portion 111. Although the pivotal portion 111 shown in FIGS. 5 and 6 is a shaft tube, the pivotal portion 111 can be in any other form including, but not limited to, a shaft base or other structure for rotatably coupling with the rotor 14. The circuit board 12 is mounted to the base 11 for activating the stator 13 to drive the rotor 14 to rotate.

Figure 7:
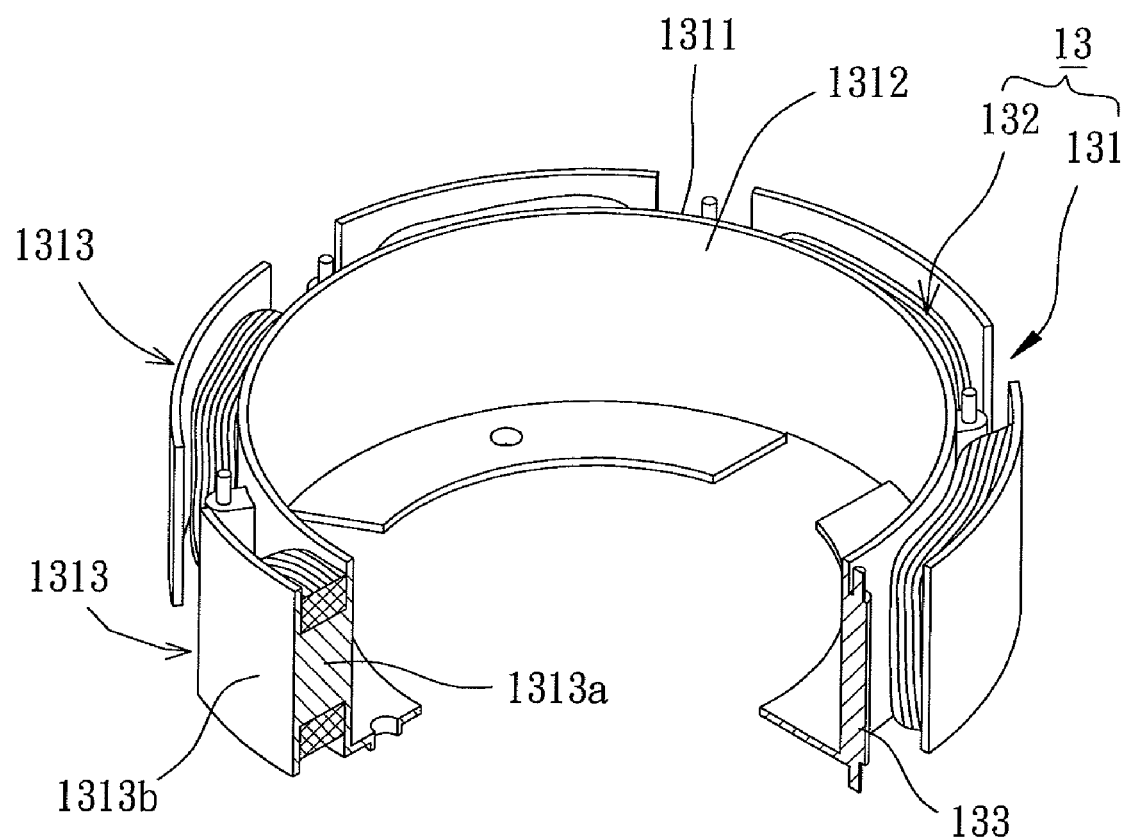
FIG. 7 shows a partial, perspective view of an example of a stator of the DC brushless motor of FIG. 5.

With reference to FIG. 7, the stator 13 includes an annular insulating ring 131 and a coil unit 132. Preferably, the annular insulating ring 131 is a ring integrally formed from an insulating material. The annular insulating ring 131 includes an outer peripheral face 1311 and an inner peripheral face 1312. A plurality of winding portions 1313 extends from the outer peripheral face 1311. The inner peripheral face 1312 surrounds the pivotal portion 111 of the base 11. The coil unit 132 includes a plurality of coils respectively wound around the winding portions 1313 and is electrically connected to the circuit board 12.

Each winding portion 1313 of the stator 13 preferably includes a rib 1313a and a stop plate 1313b. An end of each rib 1313a is interconnected to the outer peripheral face 1311. The other end of each rib 1313a is interconnected to one of the stop plates 1313b. Each stop plate 1313b has a spacing to the outer peripheral face 1311 to form a winding space. Each coil of the coil unit 132 is wound around one of the ribs 1313a and located in the winding spaces. The stop plates 1313b prevent the coils of the coil unit 132 from disengaging from the annular insulating ring 131.

Figure 8:
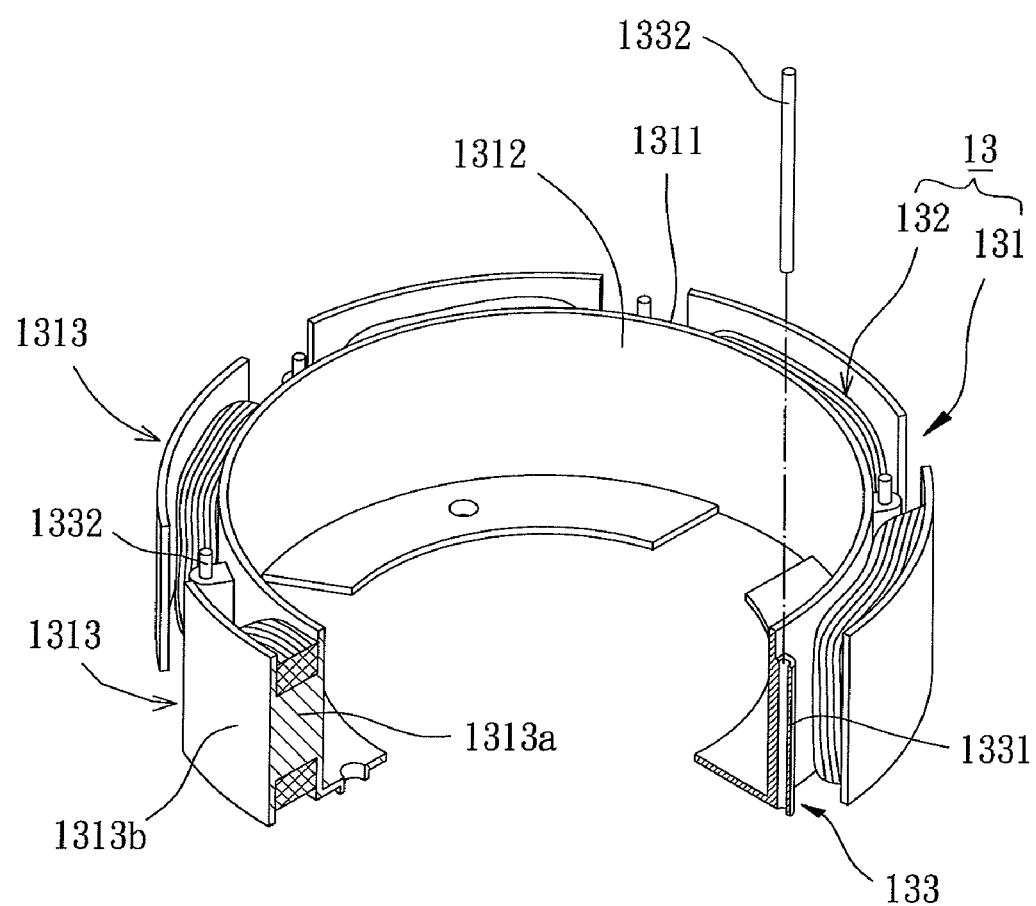
FIG. 8 shows a partial, perspective view of another example of the stator of the DC brushless motor of FIG. 5.
Figure 9:
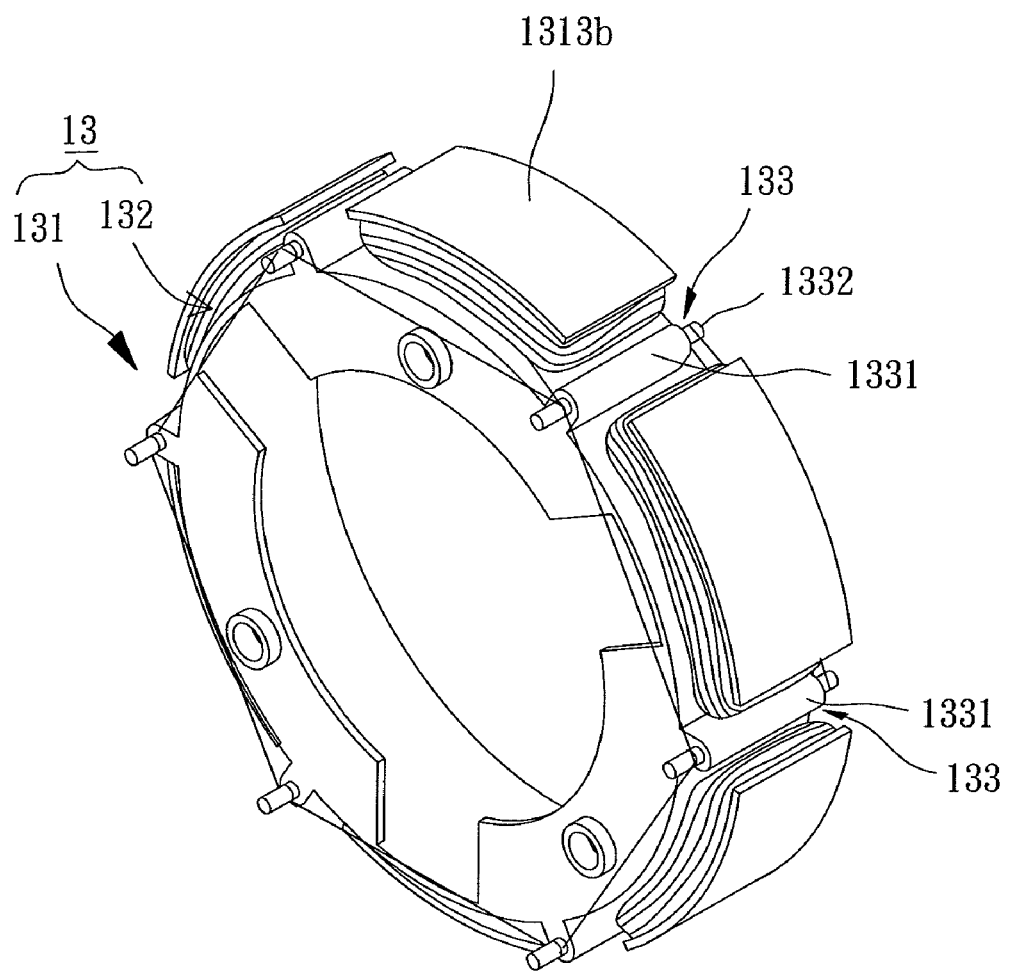
FIG. 9 shows a perspective view of the stator of FIG. 8, illustrating winding of a coil unit around positioning members of the stator.

Preferably, the stator 13 includes at least one positioning member 133 formed on a suitable location on the annular insulating ring 131. As an example, at least one positioning member 133 is provided between two adjacent winding portions 1313 of the annular insulating ring 131. In the example shown in FIGS. 5-7, a positioning member 133 is provided between each pair of winding portions 1313. Alternatively, at least one of the stop plates 1313b of the annular insulating ring 131 can include a positioning member 133. Furthermore, each positioning member 133 can be in the form of a post or a hook, so that the coil unit 132 can be wound around the post or hook for positioning purposes. Further, each positioning member 133 can be integrally formed with the outer peripheral face 1311 of the annular insulating ring 131 as a single continuous monolithic piece as shown in FIG. 7. In another example shown in FIG. 8, each positioning member 133 is in the form of a hollow cylinder 1331 formed on the outer peripheral face 1311 of the annular insulating ring 131. Each cylinder 1331 receives a pin 1332 preferably made of electrically conductive material, so that the coils of the coil unit 132 can be wound around the pins 1332 for electrical connection (FIG. 9). Thus, the winding operation of the coil unit 132 is easier, allowing convenient assembly.

The rotor 14 includes a hub 141 and a permanent magnet 142. The hub 141 includes a shaft 143 rotatably coupled to the pivotal portion 111 of the base 11. The permanent magnet 142 is mounted to the hub 141 and surrounds the outer peripheral face 1311 of the annular insulating ring 131. The permanent magnet 142 has a magnet face facing the coil unit 132.

In use, the circuit board 12 is connected to an external power source to activate the coil unit 132 of the stator 13, so that the coil unit 132 interacts with the permanent magnet 142 to drive the rotor 14 to rotate about a center of the pivotal portion 111 of the base 11.

In the DC brushless motor 1 according to the preferred teachings of the present invention, the stator 13 does not include conventional silicon steel plates and can be comprised of the annular insulating ring 131 and the coil unit 132 while achieving the same function of driving the rotor 14 to rotate. Therefore, the whole structure of the stator 13 is simple and, thus, has low manufacturing costs while enhancing the assembling convenience. Furthermore, the axial height of the stator 13 can be reduced to allow designs of the DC brushless motor 1 in meeting the trend of miniaturization. Of more importance, by not using conventional silicon steel plates, the cogging torque is avoided during movement of the permanent magnet 142 relative to the stator 13. Thus, the rotational movement of the rotor 14 is more stable.

Figure 10:
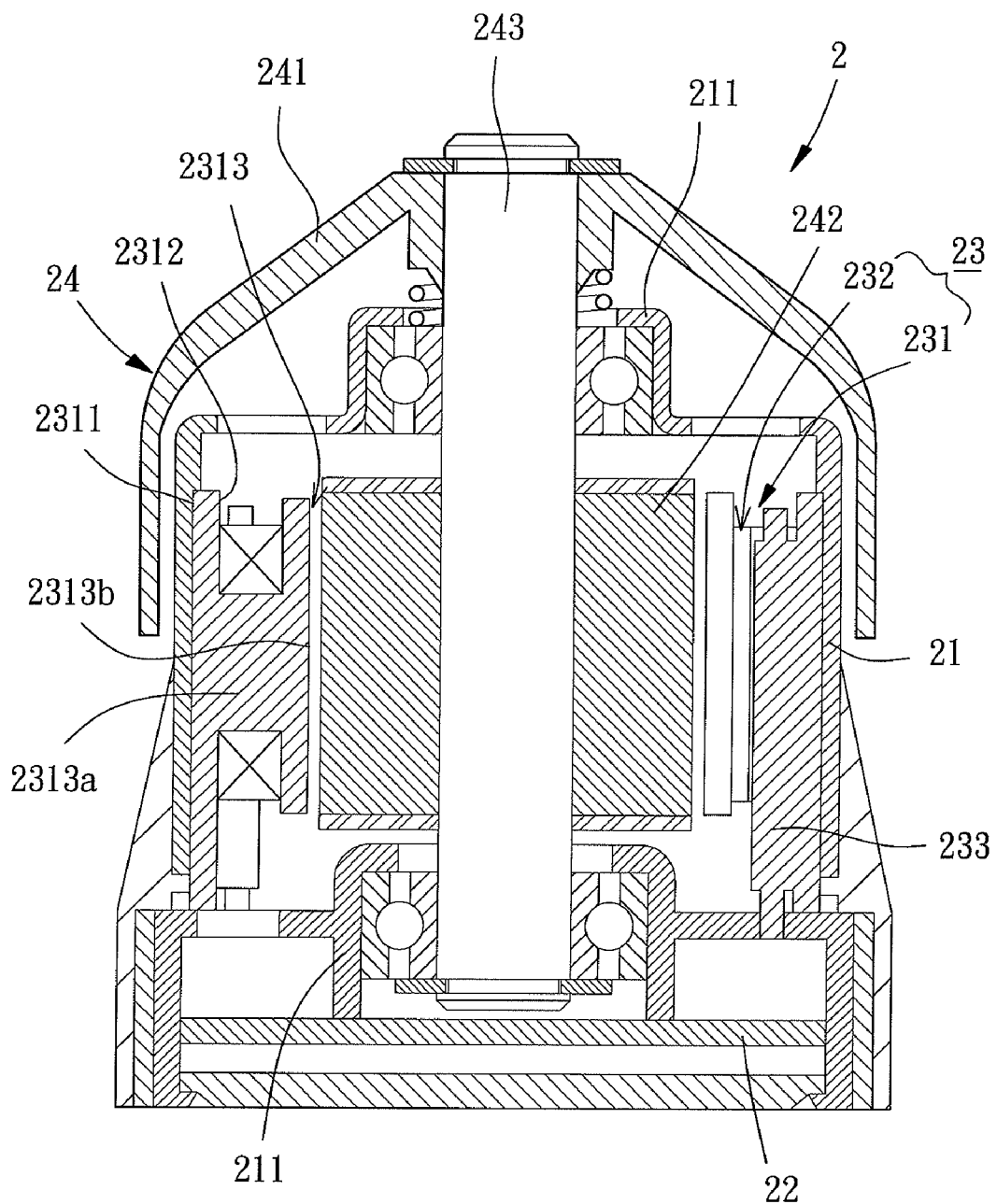
FIG. 10 shows a cross sectional view of a DC brushless motor of a second embodiment according to the preferred teachings of the present invention.

FIG. 10 shows a DC brushless motor 2 of a second embodiment according to the preferred teachings of the present invention. The DC brushless motor 2 is of inner rotor type and includes a housing 21, a circuit board 22, a stator 23, and a rotor 24. The housing 21 includes two pivotal portions 211 each receiving a bearing and a retaining ring for stably supporting the rotor 24. Although the housing 21 shown in FIG. 10 includes two pivotal portions 211, the housing 21 can include only one pivotal portion 211 or more than two pivotal portions 211. The circuit board 22 is mounted to the housing 21 for activating the stator 23 to drive the rotor 24 to rotate.

Figure 11:
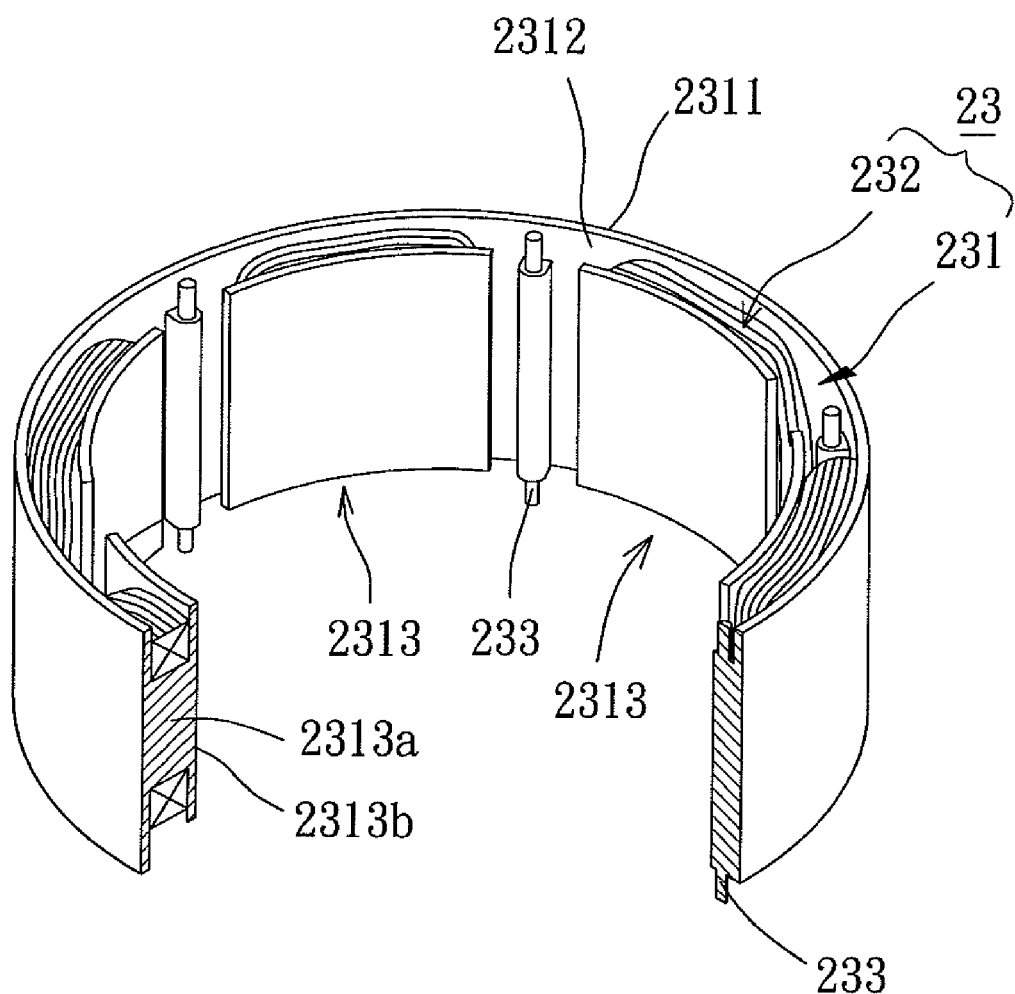
FIG. 11 shows a partial, perspective view of a stator of the DC brushless motor of FIG. 10.

With reference to FIG. 11, the stator 23 is mounted in the housing 21 and includes an annular insulating ring 231 and a coil unit 232. Preferably, the annular insulating ring 231 is a ring integrally formed from an insulating material. The annular insulating ring 231 includes an outer peripheral face 2311 and an inner peripheral face 2312. The outer peripheral face 2311 faces an inner periphery of the housing 21. A plurality of winding portions 2313 extends from the inner peripheral face 2312. The coil unit 232 includes a plurality of coils respectively wound around the winding portions 2313 and is electrically connected to the circuit board 22. A positioning member 233 is formed between each pair of winding portions 2313 of the stator 23. Alternatively, the positioning members 233 can be formed in other locations of the annular insulating ring 231. The function of the positioning members 233 is substantially the same as that provided by the positioning members 133 of the first embodiment and, thus, not described in detail to avoid redundancy.

Each winding portion 2313 of the stator 23 preferably includes a rib 2313a and a stop plate 2313b. An end of each rib 2313a is interconnected to the inner peripheral face 2312. The other end of each rib 2313a is interconnected to one of the stop plates 2313b. Each stop plate 2313b has a spacing to the inner peripheral face 2312 to form a winding space. Each coil of the coil unit 232 is wound around one of the ribs 2313a and located in the winding spaces. The stop plates 2313b prevent the coils of the coil unit 232 from disengaging from the annular insulating ring 231.

The rotor 24 includes a hub 241 and a permanent magnet 242. The hub 241 includes a shaft 243 rotatably coupled to the pivotal portions 211 of the housing 21. The permanent magnet 242 is mounted to the hub 241 and surrounded by the inner peripheral face 2312 of the annular insulating ring 231. Furthermore, the permanent magnet 242 has a magnet face facing the coil unit 232.

In the DC brushless motor 2 according to the preferred teachings of the present invention, the stator 23 does not include conventional silicon steel plates and can be comprised of the annular insulating ring 231 and the coil unit 232. Thus, the stator 23 includes the advantages of simple structure, low manufacturing costs, assembling convenience, possible reduction in the axial height, and prevention of cogging torque. It can be appreciated that the DC brushless motor 2 of the second embodiment according to the preferred teachings of the present invention is of inner rotor type, while the DC brushless motor 1 of the first embodiment according to the preferred teachings of the present invention is of outer rotor type.

Figure 12:
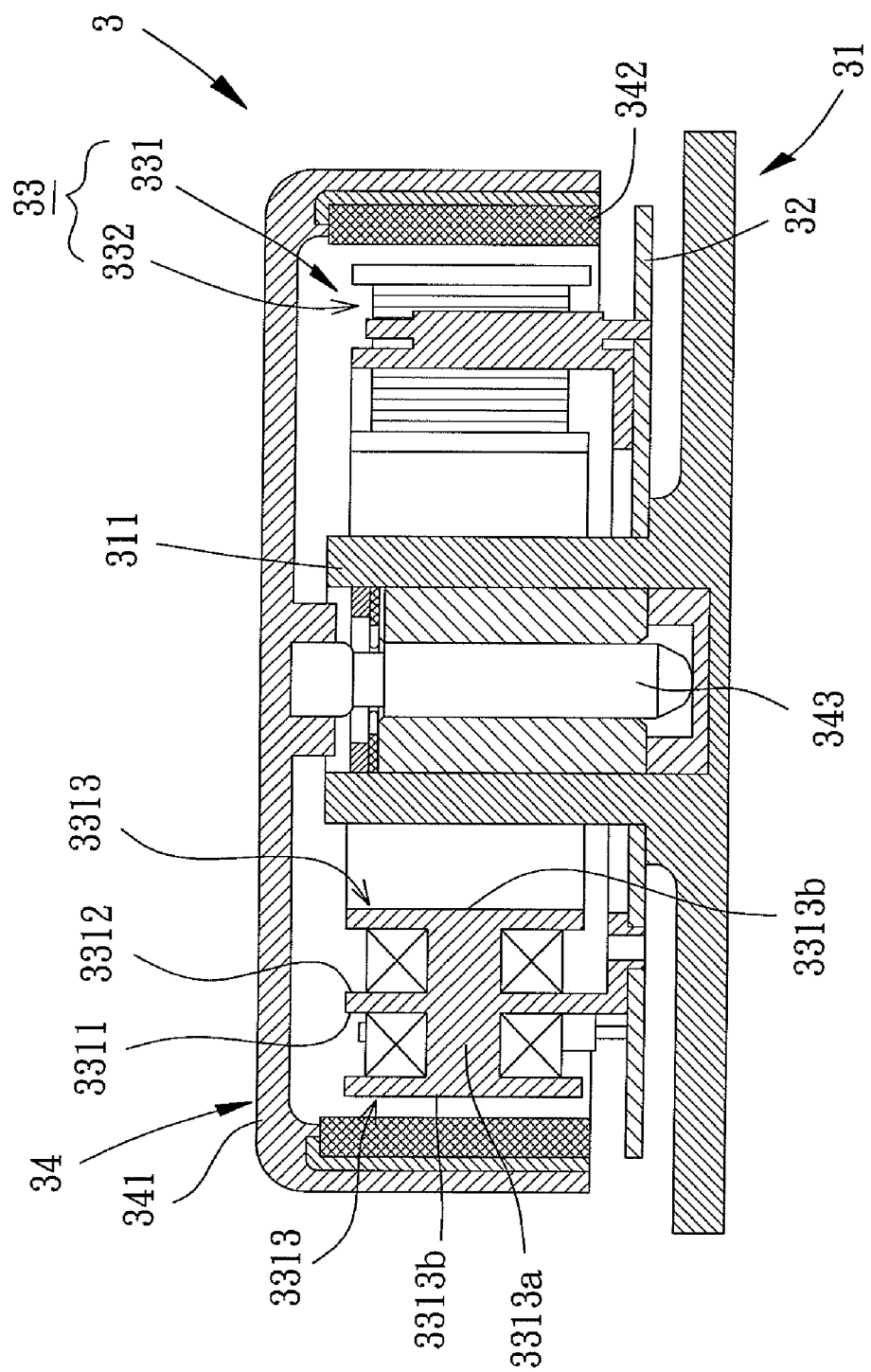
FIG. 12 shows a cross sectional view of a DC brushless motor of a third embodiment according to the preferred teachings of the present invention.

FIG. 12 shows a DC brushless motor 3 of a third embodiment according to the preferred teachings of the present invention. The DC brushless motor 3 is of outer rotor type and includes a base 31, a circuit board 32, a stator 33, and a rotor 34. The base 31 includes a pivotal portion 311. The rotor 34 includes a hub 341, a permanent magnet 342, and a shaft 343. The base 31, the circuit board 32, and the rotor 34 are substantially the same as the base 11, the circuit board 12, and the rotor 14 of the first embodiment and, therefore, not described in detail to avoid redundancy.

Figure 13:
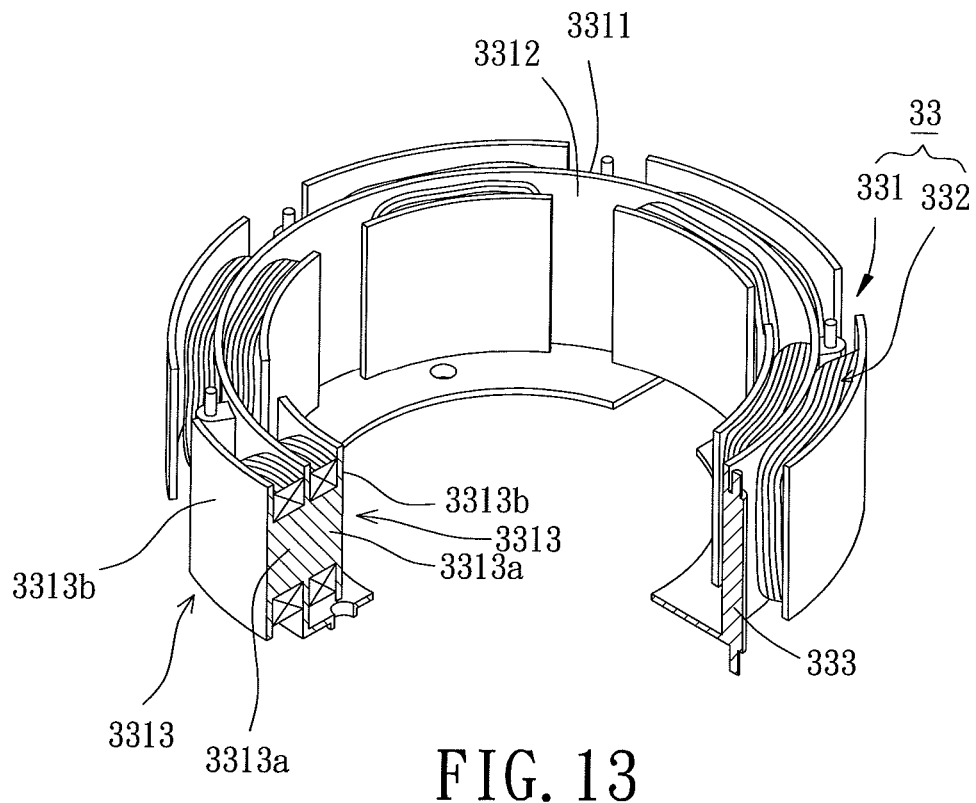
FIG. 13 shows a partial, perspective view of an example of a stator of the DC brushless motor of FIG. 12.

With reference to FIG. 13, the stator 33 includes an annular insulating ring 331 and a coil unit 332. Preferably, the annular insulating ring 331 is a ring integrally formed from an insulating material. The annular insulating ring 331 includes an outer peripheral face 3311 and an inner peripheral face 3312. A plurality of winding portions 3313 extends from each of the outer and inner peripheral faces 3311 and 3312. The inner peripheral face 1312 surrounds the pivotal portion 311 of the base 31. The coil unit 332 includes a plurality of coils respectively wound around the winding portions 3313 and is electrically connected to the circuit board 32. A positioning member 333 is formed between each pair of winding portions 3313 of the stator 33. Alternatively, the positioning members 333 can be formed in other locations of the annular insulating ring 331. The function of the positioning members 333 is substantially the same as that provided by the positioning members 133 of the first embodiment and, thus, not described in detail to avoid redundancy.

Figure 14:
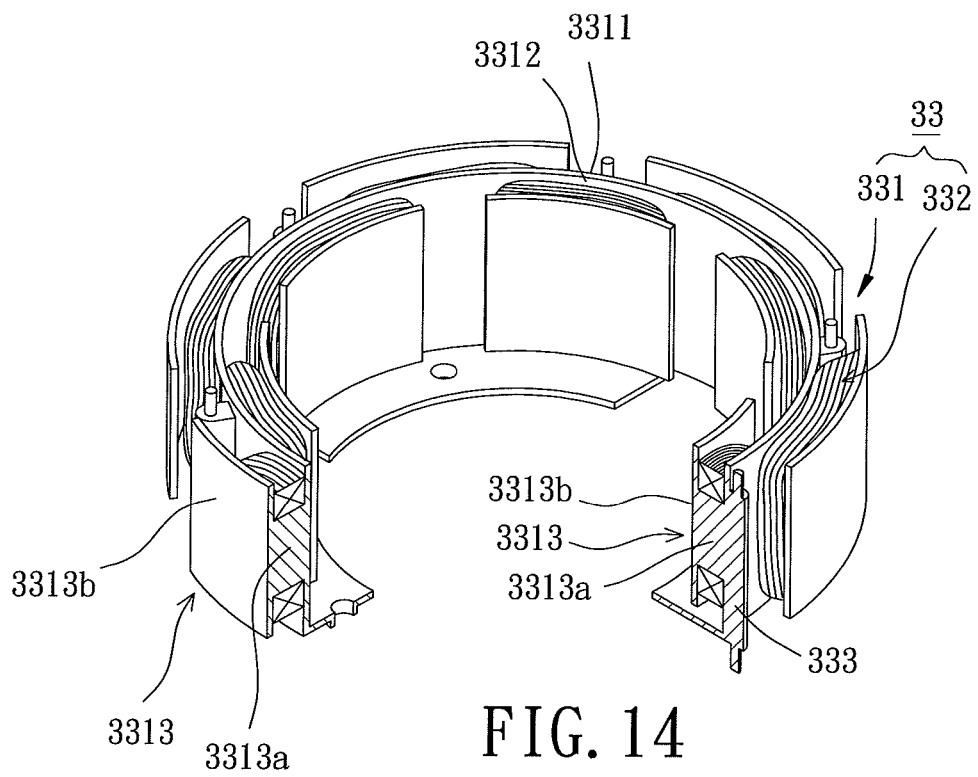
FIG. 14 shows a partial, perspective view of another example of the stator of the DC brushless motor of FIG. 12.

The winding portions 3313 located outside of the outer peripheral face 3311 can be aligned with the winding portions 3313 located inside of the inner peripheral face 3312, as shown in FIG. 13. However, the winding portions 3313 located outside of the outer peripheral face 3311 can be misaligned with the winding portions 3313 located inside of the inner peripheral face 3312 (see FIG. 14), so that the rotational stability of the rotor 34 can be enhanced while the rotor 34 is driven by the stator 33.

Each winding portion 3313 of the stator 33 preferably includes a rib 3313a and a stop plate 3313b. Each rib 3313a located outside of the outer peripheral face 3311 includes a first end interconnected to the outer peripheral face 3311 and a second end interconnected to one of the stop plates 3313b located outside of the outer peripheral face 3311. Thus, each stop plate 3313b located outside of the outer peripheral face 3311 has a spacing to the outer peripheral face 3311 to form a winding space. Furthermore, each rib 3313a located inside of the inner peripheral face 3312 includes a first end interconnected to the inner peripheral face 3312 and a second end interconnected to one of the stop plates 3313b located inside of the inner peripheral face 3312. Thus, each stop plate 3313b located inside of the inner peripheral face 3312 has a spacing to the inner peripheral face 3312 to form a winding space. Each coil of the coil unit 332 is wound around one of the ribs 3313a and located in the winding spaces. The stop plates 3313b prevent the coils of the coil unit 332 from disengaging from the annular insulating ring 331.

In the DC brushless motor 3 according to the preferred teachings of the present invention, the stator 33 does not include conventional silicon steel plates and can be comprised of the annular insulating ring 331 and the coil unit 332. Thus, the stator 33 includes the advantages of simple structure, low manufacturing costs, assembling convenience, possible reduction in the axial height, and prevention of cogging torque. Furthermore, since winding portions 3313 are formed on each of the outer and inner peripheral faces 3311 and 3312 of the stator 33 of the DC brushless motor 3 according to the preferred teachings of the present invention, the coil unit 332 can include more coils wound around the winding portions 3313. Thus, the torque and the speed of the DC brushless motor 3 can be increased.

Figure 15:
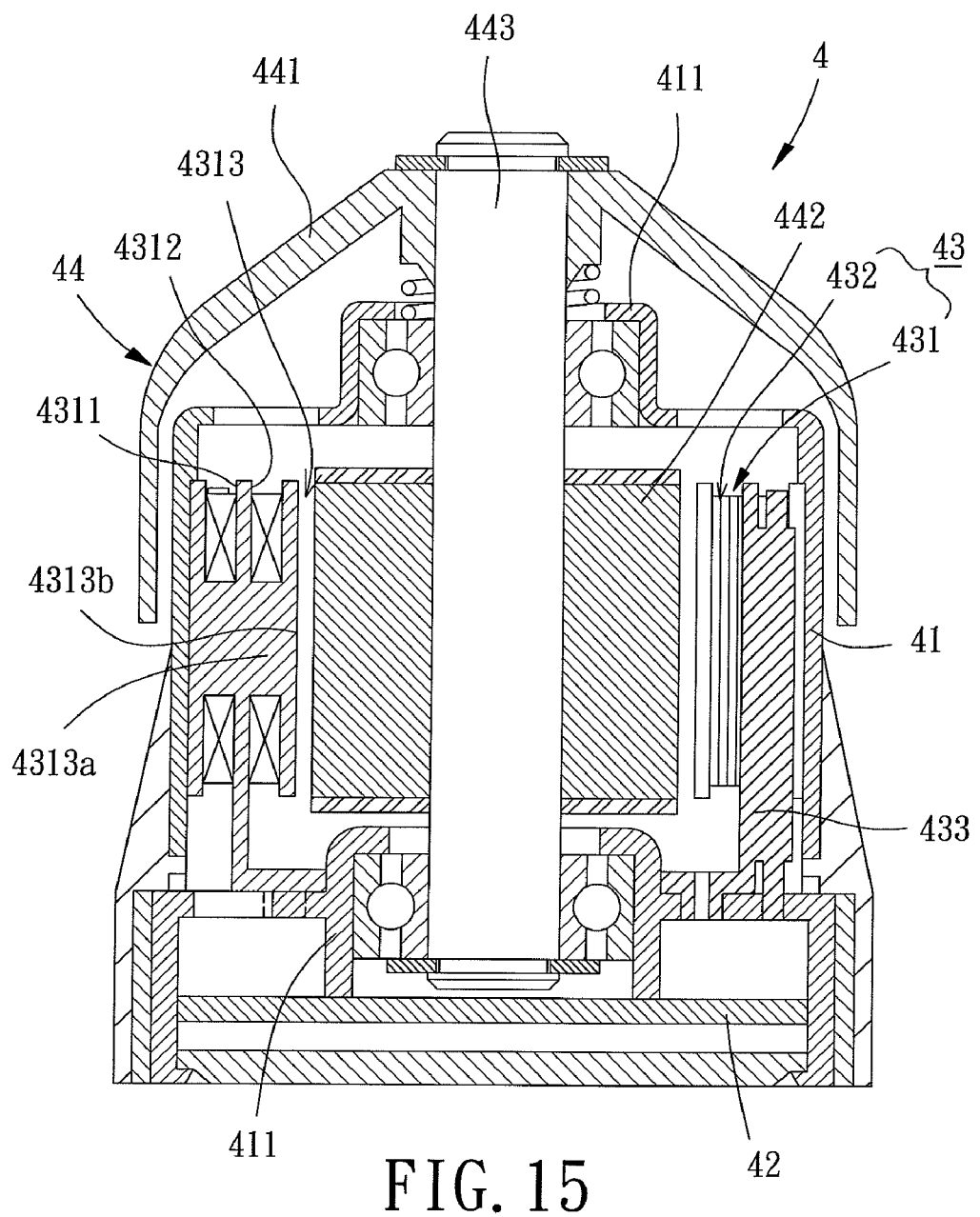
FIG. 15 shows a cross sectional view of a DC brushless motor of a fourth embodiment according to the preferred teachings of the present invention.

FIG. 15 shows a DC brushless motor 4 of a fourth embodiment according to the preferred teachings of the present invention. The DC brushless motor 4 is of inner rotor type and includes a housing 41, a circuit board 42, a stator 43, and a rotor 44. The housing 41 includes at least one pivotal portion 411 for stably supporting the rotor 44. The rotor 44 includes a hub 441, a permanent magnet 442, and a shaft 443. The housing 41, the circuit board 42, and the rotor 44 are substantially the same as the housing 21, the circuit board 22, and the rotor 24 of the second embodiment and, therefore, not described in detail to avoid redundancy.

Figure 16:
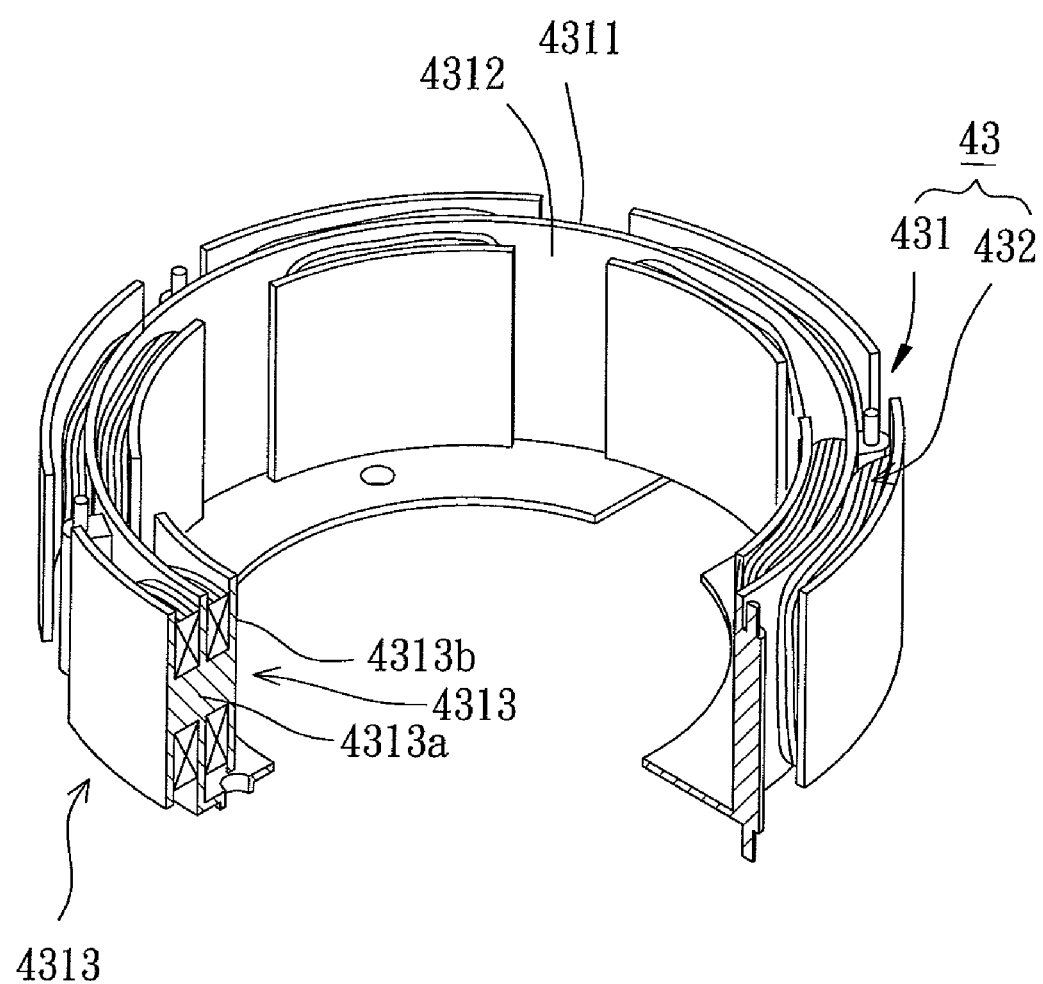
FIG. 16 shows a partial, perspective view of a stator of the DC brushless motor of FIG. 15.

With reference to FIG. 16, the stator 43 is mounted in the housing 41 and includes an annular insulating ring 431 and a coil unit 432. Preferably, the annular insulating ring 431 is a ring integrally formed from an insulating material. The annular insulating ring 431 includes an outer peripheral face 4311 and an inner peripheral face 4312. The outer peripheral face 4311 faces the inner periphery of the housing 41. A plurality of winding portions 4313 extends from each of the outer and inner peripheral faces 4311 and 4312. Each winding portion 4313 of the stator 43 includes a rib 4313a and a stop plate 4313b. The coil unit 432 is wound around the winding portions 4313 and electrically connected to the circuit board 42. The stator 43 is substantially the same as the stator 33 of the third embodiment and, therefore, not described in detail to avoid redundancy.

In the DC brushless motor 4 according to the preferred teachings of the present invention, the stator 43 does not include conventional silicon steel plates and can be comprised of the annular insulating ring 431 and the coil unit 432. Thus, the stator 43 includes the advantages of simple structure, low manufacturing costs, assembling convenience, possible reduction in the axial height, and prevention of cogging torque. Furthermore, since winding portions 4313 are formed on each of the outer and inner peripheral faces 4311 and 4312 of the stator 43 of the DC brushless motor 4 according to the preferred teachings of the present invention, the torque and the speed of the DC brushless motor 4 can be increased, for the coil unit 432 can include more coils wound around the winding portions 4313. It can be appreciated that the DC brushless motor 4 of the fourth embodiment according to the preferred teachings of the present invention is of inner rotor type, while the DC brushless motor 3 of the third embodiment according to the preferred teachings of the present invention is of outer rotor type.

Figure 17:
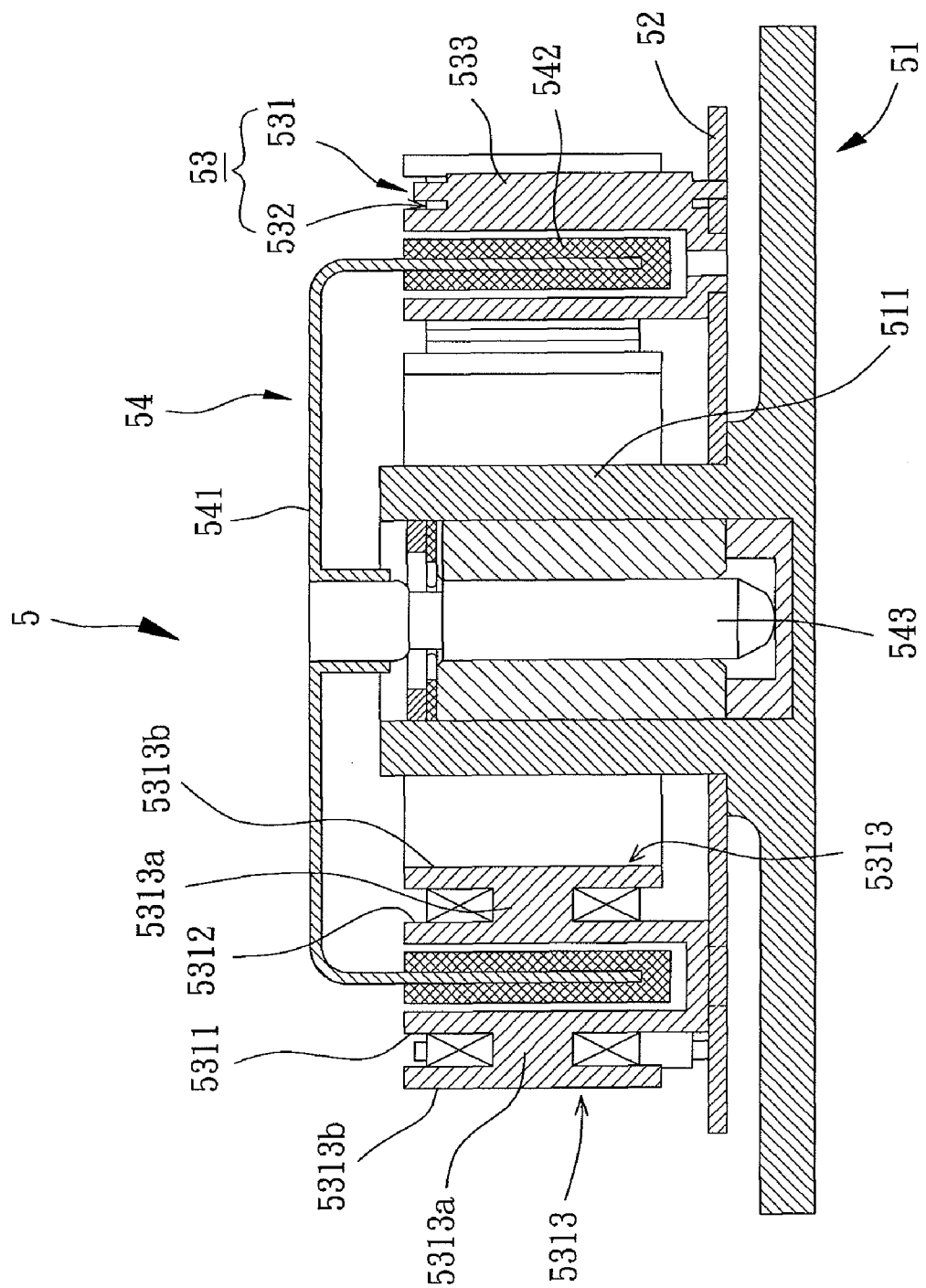
FIG. 17 shows a cross sectional view of a DC brushless motor of a fifth embodiment according to the preferred teachings of the present invention.

FIG. 17 shows a DC brushless motor 5 of a fifth embodiment according to the preferred teachings of the present invention. The DC brushless motor 5 includes a base 51, a circuit board 52, a stator 53, and a rotor 54. The base 51 includes a pivotal portion 511 for rotatably coupling with the rotor 54. The circuit board 52 is mounted to the base 51 for activating the stator 53 for driving the rotor 54 to rotate.

Figure 18:
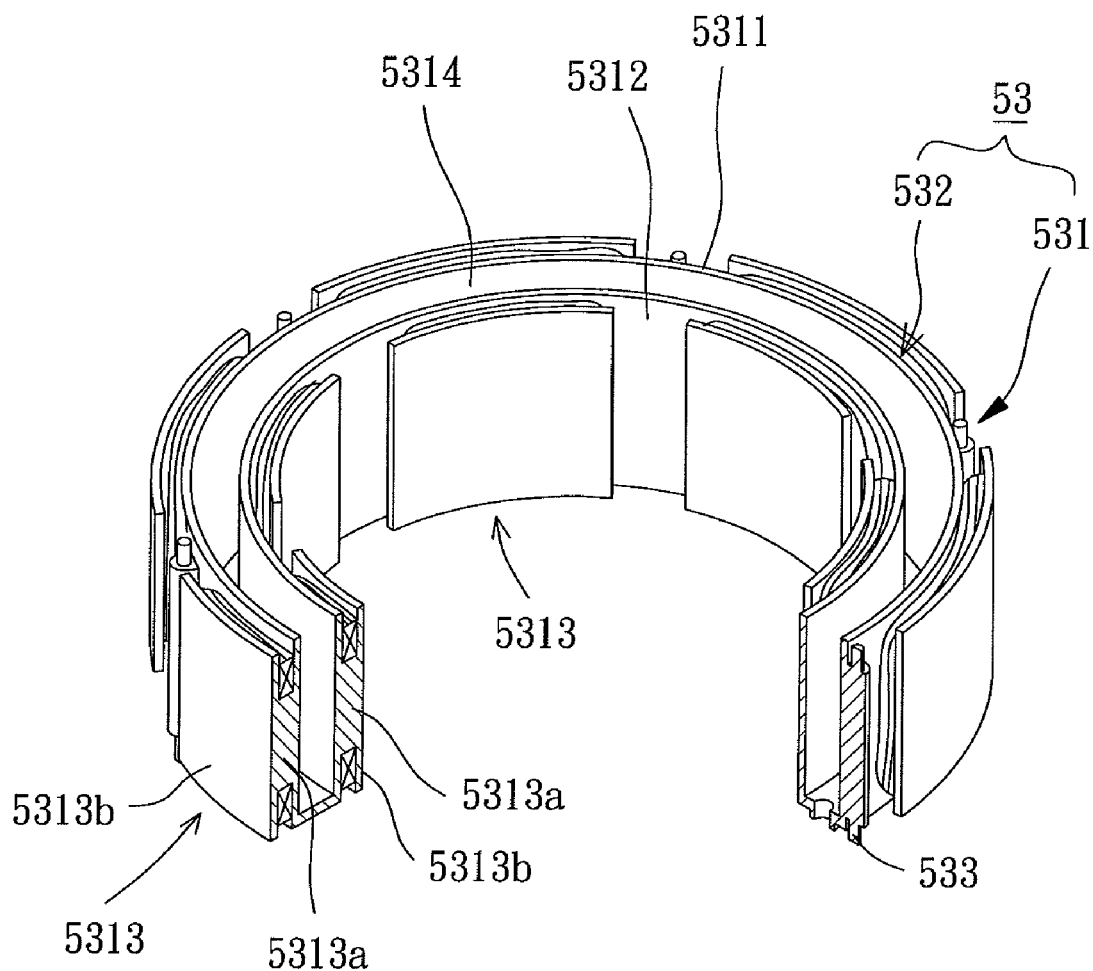
FIG. 18 shows a partial, perspective view of a stator of the DC brushless motor of FIG. 17.

With reference to FIG. 18, the stator 53 includes an annular insulating ring 531 and a coil unit 532. Preferably, the annular insulating ring 531 is integrally formed from an insulating material. The annular insulating ring 531 includes an outer peripheral face 5311 and an inner peripheral face 5312. A plurality of winding portions 5313 extends from each of the outer and inner peripheral faces 5311 and 5312. The inner peripheral face 5312 surrounds the pivotal portion 511 of the base 51. An annular groove 5314 is formed between the outer and inner peripheral faces 5311 and 5312 and has an opening. The coil unit 532 includes a plurality of coils wound around the winding portions 5313 and is electrically connected to the circuit board 52. Each winding portion 5313 includes a rib 5313a and a stop plate 5313b. A positioning member 533 is provided between each pair of winding portions 5313. The ribs 5313a, the stop plates 5313b, and the positioning members 533 are substantially the same as the ribs 3313a, the stop plates 3313b, and the positioning members 333 of the third embodiment and, therefore, not described in detail to avoid redundancy.

The rotor 54 includes a hub 541 and a permanent magnet 542. The hub 541 includes a shaft 543 rotatably coupled to the pivotal portion 511 of the base 51. The permanent magnet 542 is mounted to the hub 541 and extends through the opening into the annular groove 5314 of the stator 53. The permanent magnet 542 has a magnet face facing the coil unit 532.

In the DC brushless motor 5 according to the preferred teachings of the present invention, the stator 53 does not include conventional silicon steel plates and can be comprised of the annular insulating ring 531 and the coil unit 532. Thus, the stator 53 includes the advantages of simple structure, low manufacturing costs, assembling convenience, possible reduction in the axial height, and prevention of cogging torque. Furthermore, since winding portions 5313 are formed on each of the outer and inner peripheral faces 5311 and 5312 of the stator 53 of the DC brushless motor 5 according to the preferred teachings of the present invention, the torque and the speed of the DC brushless motor 5 can be increased, for the coil unit 532 can include more coils wound around the winding portions 5313.

Figure 19:
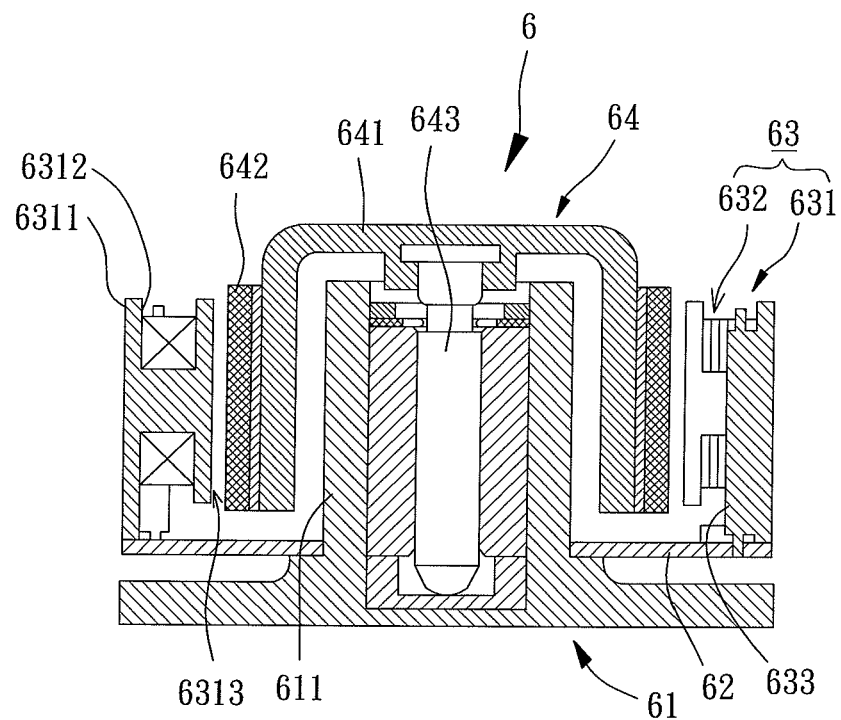
FIG. 19 shows a cross sectional view of a DC brushless motor of a sixth embodiment according to the preferred teachings of the present invention.

FIG. 19 shows a DC brushless motor 6 of a sixth embodiment according to the preferred teachings of the present invention of an inner rotor type. The DC brushless motor 6 includes a base 61, a circuit board 62, a stator 63, and a rotor 64. The base 61 includes a pivotal portion 611 for rotatably coupling with the rotor 64. The circuit board 62 is mounted to the base 61 for activating the stator 63 for driving the rotor 64 to rotate.

The stator 63 is substantially the same as the stator 23 of the second embodiment. Specifically, the stator 63 includes an annular insulating ring 631, a coil unit 632, and at least one positioning member 633. The annular insulating ring 631 includes outer and inner peripheral faces 6311 and 6312 and winding portions 6313. Each winding portion 6313 of the stator 63 includes a rib 6313a and a stop plate 6313b. Detailed description of the stator 63 is not provided to avoid redundancy.

The rotor 64 includes a hub 641 and a permanent magnet 642. The hub 641 includes a shaft 643 rotatably coupled to the pivotal portion 611 of the base 61. The permanent magnet 642 is mounted to the hub 641 and surrounded by the inner peripheral face 6312 of the stator 63. Furthermore, the permanent magnet 642 has a magnet face facing the coil unit 632.

Figure 20:
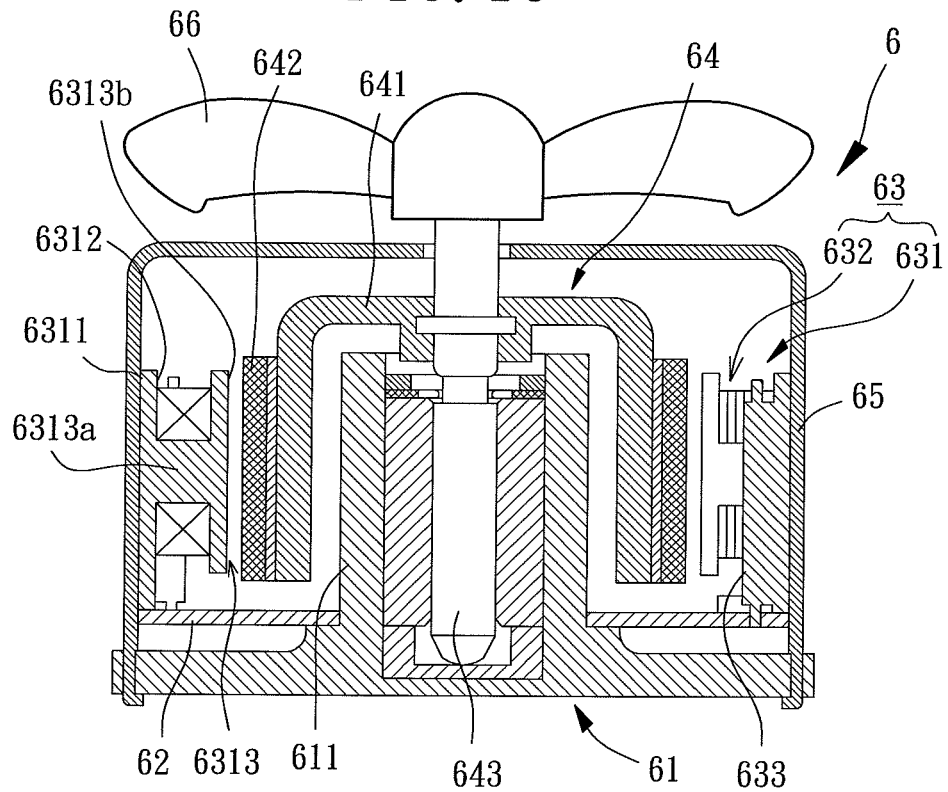
FIG. 20 shows a cross sectional view of a heat dissipating fan utilizing the DC brushless motor of FIG. 19.
Figure 21:
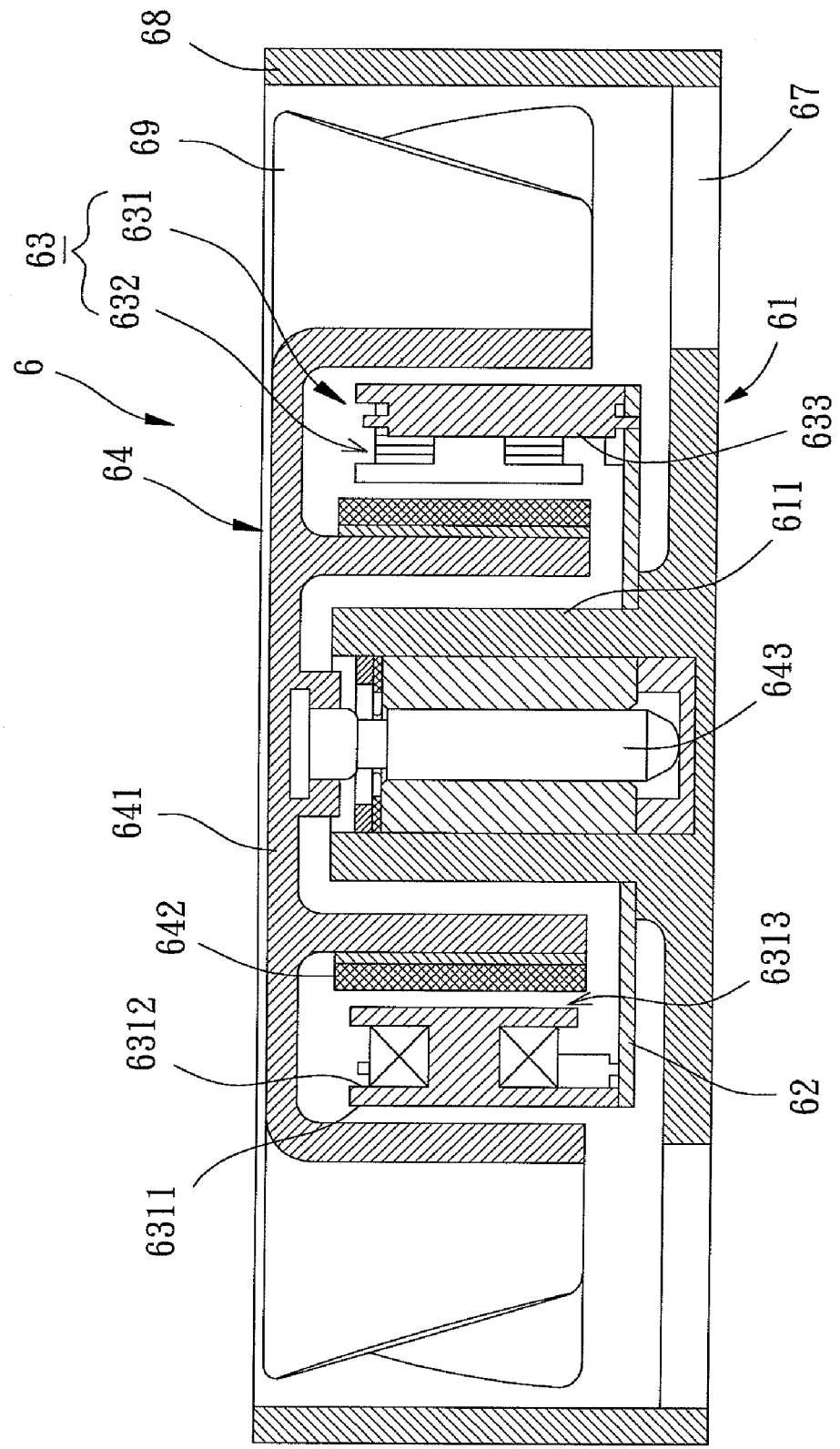
FIG. 21 shows a cross sectional view of a heat dissipating fan utilizing the DC brushless motor of FIG. 19.

In the DC brushless motor 6 according to the preferred teachings of the present invention, the stator 63 does not include conventional silicon steel plates and can be comprised of the annular insulating ring 631 and the coil unit 632. Thus, the stator 63 includes the advantages of simple structure, low manufacturing costs, assembling convenience, possible reduction in the axial height, and prevention of cogging torque. Furthermore, the DC brushless motor 6 of the sixth embodiment according to the preferred teachings of the present invention can be utilized in heat dissipating fans. As an example, the base 61 can be coupled to a housing 65 receiving the circuit board 62, the stator 63, and the hub 641 and the permanent magnet 642 of the rotor 64, as shown in FIG. 20. Furthermore, an end of the shaft 643 extends beyond the housing 65 for coupling with an impeller 66. Thus, the DC brushless motor 6 can be utilized to form a heat dissipating fan.

In another example, the base 61 can be interconnected by a plurality of connecting members 67 to a casing 68. Furthermore, a plurality of blades 69 can be formed on the hub 641 of the rotor 64. Thus, the DC brushless motor 6 can be utilized to form a heat dissipating fan of another type.

Figure 22:
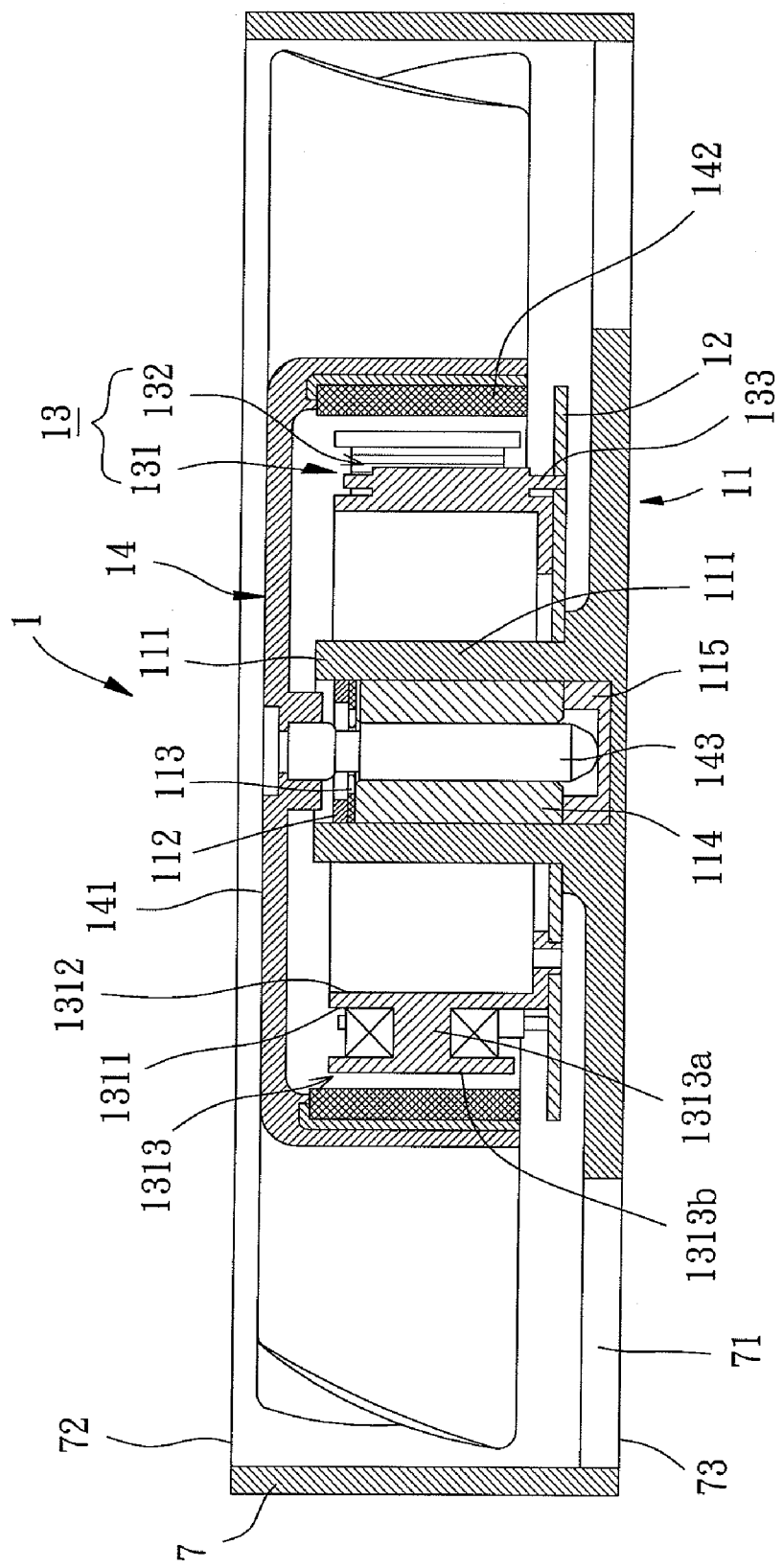
FIG. 22 shows a cross sectional view of a heat dissipating fan utilizing the DC brushless motor of FIG. 5.

It can be appreciated that not only the DC brushless motor 6 of the sixth embodiment according to the preferred teachings of the present invention but the DC brushless motors 1, 2, 3, 4, and 5 of the first, second, third, fourth, and fifth embodiments according to the preferred teachings of the present invention can be utilized to form a heat dissipating fan. In an example shown in FIG. 22, the base 11 of the DC brushless motor 1 of the first embodiment is interconnected to a casing 7 by a plurality of connecting members 71 in the form of ribs or stationary vanes. The casing 7 includes an air inlet 72 and an air outlet 73 on opposite sides thereof. By such an arrangement, the heat dissipating fan can be mounted in various electronic devices or equipment to achieve a desired heat dissipating function.

In the DC brushless motors 1, 2, 3, 4, 5, 6 according to the preferred teachings of the present invention, by extending a plurality of winding portions 1313, 2313, 3313, 4313, 5313, 6313 from at least one of the outer peripheral face 1311, 2311, 3311, 4311, 5311, 6311 and the inner peripheral face 1312, 2312, 3312, 4312, 5312, 6312 for the coil unit 132, 232, 332, 432, 532, 632 to wind around the winding portions 1313, 2313, 3313, 4313, 5313, 6313, many advantages can be achieved. Specifically, compared to the conventional stator structures, the stator 13, 23, 33, 43, 53, 63 according to the preferred teachings of the present invention does not include conventional silicon steel plates while achieving the function of driving the rotor 14, 24, 34, 44, 54, 64 to rotate. Thus, in assembly, stacking of the conventional silicon steel plates is not required, and the resultant structure of the stator 13, 23, 33, 43, 53, 63 is relatively simple. Accordingly, the manufacturing costs are cut, and the assembling convenience is enhanced. Furthermore, since the stator 13, 23, 33, 43, 53, 63 according to the preferred teachings of the present invention does not include silicon steel plates and the upper and lower insulating sleeves required in conventional stators, the axial height of the stator 13, 23, 33, 43, 53, 63 can be effectively reduced, allowing miniature designs of the DC brushless motors 1, 2, 3, 4, 5, 6. Further, compared to the cogging torque that occurs easily in conventional stators during movement of the north and south poles of the permanent magnet relative to the magnetic pole faces of the silicon steel plates, the stator 13, 23, 33, 43, 53, 63 according to the preferred teachings of the present invention without silicon steel plates can effectively avoid cogging torque during rotation of the rotor 14, 24, 34, 44, 54, 64.

As mentioned above, the DC brushless motors 1, 2, 3, 4, 5, 6 and the stators 13, 23, 33, 43, 53, 63 according to the preferred teachings of the present invention provide the advantages of low manufacturing costs, assembling convenience, reduction in the axial height, and rotational stability.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A DC brushless motor comprising:
 a circuit board;
 at least one pivotal portion;
 a stator including an annular insulating ring and a coil unit, with the annular insulating ring including a first peripheral face and at least one positioning member, with a plurality of winding portions extending from the first peripheral face, with the coil unit wound around each of the plurality of winding portions and around said at least one positioning member and electrically connected to the circuit board; and
 a rotor including a hub and a permanent magnet, with the hub including a shaft rotatably coupled to said at least one pivotal portion, with the permanent magnet mounted to the hub, and with the permanent magnet surrounded by the first peripheral face of the annular insulating ring and having a magnet face facing the coil unit, with said at least one positioning member being integrally formed on the first peripheral face of the annular insulating ring as a single continuous monolithic piece, and with said at least one positioning member being a post or a hook.

2. The DC brushless motor as claimed in claim 1, further comprising:
a base including the at least one pivotal portion, with the circuit board mounted to the base, with the first peripheral face being an outer peripheral face, with the annular insulating ring including an inner peripheral face, with the inner peripheral face surrounding the at least one pivotal portion.

3. The DC brushless motor as claimed in claim 2, with said at least one positioning member located between two of the plurality of winding portions adjacent to each other.

4. The DC brushless motor as claimed in claim 2, with each of the plurality of winding portions including a rib and a stop plate, with each of the ribs including a first end interconnected to the outer peripheral face and a second end interconnected to one of the stop plates, with each of the stop plates having a spacing to the outer peripheral face to form a winding space, and with the coil unit wound around the ribs and located in the winding space.

5. The DC brushless motor as claimed in claim 1, further comprising:
a housing including the at least one pivotal portion, with the stator mounted in the housing, with the first peripheral face being an inner peripheral face, with the annular insulating ring including an outer peripheral face, with the outer peripheral face facing an inner periphery of the housing.

6. The DC brushless motor as claimed in claim 5, with said at least one positioning member located between two of the plurality of winding portions adjacent to each other.

7. The DC brushless motor as claimed in claim 1, with each of the plurality of winding portions including a rib and a stop plate, with each of the ribs including a first end interconnected to the inner peripheral face and a second end interconnected to one of the stop plates, with each of the stop plates having a spacing to the inner peripheral face to form a winding space, and with the coil unit wound around the ribs and located in the winding space.

8. The DC brushless motor as claimed in claim 1, further comprising:
a base including the at least one pivotal portion, with the circuit board mounted to the base, with the first peripheral face being an outer peripheral face, with the annular insulating ring including an inner peripheral face, with the plurality of winding portions extending from each of the outer and inner peripheral faces, with the inner peripheral face surrounding the at least one pivotal portion.

9. The DC brushless motor as claimed in claim 8, with said at least one positioning member located between two of the plurality of winding portions adjacent to each other.

10. The DC brushless motor as claimed in claim 8, with each of the plurality of winding portions including a rib and a stop plate, with each of the ribs located outside of the outer peripheral face including a first end interconnected to the outer peripheral face and a second end interconnected to one of the stop plates located outside of the outer peripheral face, with each of the ribs located inside of the inner peripheral face including a first end interconnected to the inner peripheral face and a second end interconnected to one of the stop plates located inside of the inner peripheral face, and with the coil unit wound around each of the ribs.

11. The DC brushless motor as claimed in claim 1, further comprising:
a housing including the at least one pivotal portion, with the stator mounted in the housing, with the first peripheral face being an outer peripheral face, with the annular insulating ring including an inner peripheral face, with the plurality of winding portions extending from each of the outer and inner peripheral faces, with the outer peripheral face facing an inner periphery of the housing.

12. The DC brushless motor as claimed in claim 11, with said at least one positioning member located between two of the plurality of winding portions adjacent to each other.

13. The DC brushless motor as claimed in claim 11, with each of the plurality of winding portions including a rib and a stop plate, with each of the ribs located outside of the outer peripheral face including a first end interconnected to the outer peripheral face and a second end interconnected to one of the stop plates located outside of the outer peripheral face, with each of the ribs located inside of the inner peripheral face including a first end interconnected to the inner peripheral face and a second end interconnected to one of the stop plates located inside of the inner peripheral face, and with the coil unit wound around each of the ribs.

14. The DC brushless motor as claimed in claim 1, further comprising:
a base including the at least one pivotal portion, with the circuit board mounted to the base, with the first peripheral face being an outer peripheral face, with the annular insulating ring including an inner peripheral face, with a plurality of winding portions extending from each of the outer and inner peripheral faces, with the inner peripheral face surrounding the at least one pivotal portion, with an annular groove formed between the outer and inner peripheral faces and having an opening.

15. The DC brushless motor as claimed in claim 14, with said at least one positioning member located between two of the plurality of winding portions adjacent to each other.

16. The DC brushless motor as claimed in claim 14, with each of the plurality of winding portions including a rib and a stop plate, with each of the ribs located outside of the outer peripheral face including a first end interconnected to the outer peripheral face and a second end interconnected to one of the stop plates located outside of the outer peripheral face, with each of the ribs located inside of the inner peripheral face including a first end interconnected to the inner peripheral face and a second end interconnected to one of the stop plates located inside of the inner peripheral face, and with the coil unit wound around each of the ribs.

17. The DC brushless motor as claimed in claim 1, further comprising:
a base including the at least one pivotal portion, with the circuit board mounted to the base, with the first peripheral face being an inner peripheral face, with the annular insulating ring including an outer peripheral face.

18. The DC brushless motor as claimed in claim 17, with said at least one positioning member located between two of the plurality of winding portions adjacent to each other.

19. The DC brushless motor as claimed in claim 17, with the base coupled to a housing, with the circuit board, the stator, and the hub and the permanent magnet of the rotor received in the housing, and with the shaft of the rotor having an end extending beyond the housing.

20. A DC brushless motor comprising:
a circuit board;
at least one pivotal portion;

a stator including an annular insulating ring and a coil unit, with the annular insulating ring including a first peripheral face and at least one positioning member, with a plurality of winding portions extending from the first peripheral face, with the coil unit wound around each of the plurality of winding portions and around said at least one positioning member and electrically connected to the circuit board; and a rotor including a hub and a permanent magnet, with the hub including a shaft rotatably coupled to said at least one pivotal portion, with the permanent magnet mounted to the hub, and with the permanent magnet surrounded by the first peripheral face of the annular insulating ring and having a magnet face facing the coil unit, with said at least one positioning member including a plurality of hollow cylinders formed on the first peripheral face of the annular insulating ring, and with a pin engaged in each of the plurality of hollow cylinders.

21. The DC brushless motor as claimed in claim 20, further comprising:
a base including the at least one pivotal portion, with the circuit board mounted to the base, with the first peripheral face being an outer peripheral face, with the annular insulating ring including an inner peripheral face, with the inner peripheral face surrounding the at least one pivotal portion.

22. The DC brushless motor as claimed in claim 21, with said at least one positioning member located between two of the plurality of winding portions adjacent to each other.

23. The DC brushless motor as claimed in claim 21, with each of the plurality of winding portions including a rib and a stop plate, with each of the ribs including a first end interconnected to the outer peripheral face and a second end interconnected to one of the stop plates, with each of the stop plates having a spacing to the outer peripheral face to form a winding space, and with the coil unit wound around the ribs and located in the winding space.

24. The DC brushless motor as claimed in claim 20, with each of the plurality of winding portions including a rib and a stop plate, with each of the ribs including a first end interconnected to the inner peripheral face and a second end interconnected to one of the stop plates, with each of the stop plates having a spacing to the inner peripheral face to form a winding space, and with the coil unit wound around the ribs and located in the winding space.

25. The DC brushless motor as claimed in claim 20, further comprising:
a base including the at least one pivotal portion, with the circuit board mounted to the base, with the first peripheral face being an outer peripheral face, with the annular insulating ring including an inner peripheral face, with the plurality of winding portions extending from each of the outer and inner peripheral faces, with the inner peripheral face surrounding the at least one pivotal portion.

26. The DC brushless motor as claimed in claim 25, with said at least one positioning member located between two of the plurality of winding portions adjacent to each other.

27. The DC brushless motor as claimed in claim 25, with each of the plurality of winding portions including a rib and a stop plate, with each of the ribs located outside of the outer peripheral face including a first end interconnected to the outer peripheral face and a second end interconnected to one of the stop plates located outside of the outer peripheral face, with each of the ribs located inside of the inner peripheral face including a first end interconnected to the inner peripheral face and a second end interconnected to one of the stop plates located inside of the inner peripheral face, and with the coil unit wound around each of the ribs.

28. The DC brushless motor as claimed in claim 20, further comprising:
a housing including the at least one pivotal portion, with the stator mounted in the housing, with the first peripheral face being an an outer peripheral face, with the annular insulating ring including an inner peripheral face, with the plurality of winding portions extending from each of the outer and inner peripheral faces, with the outer peripheral face facing an inner periphery of the housing.

29. The DC brushless motor as claimed in claim 28, with said at least one positioning member located between two of the plurality of winding portions adjacent to each other.

30. The DC brushless motor as claimed in claim 28, with each of the plurality of winding portions including a rib and a stop plate, with each of the ribs located outside of the outer peripheral face including a first end interconnected to the outer peripheral face and a second end interconnected to one of the stop plates located outside of the outer peripheral face, with each of the ribs located inside of the inner peripheral face including a first end interconnected to the inner peripheral face and a second end interconnected to one of the stop plates located inside of the inner peripheral face, and with the coil unit wound around each of the ribs.

31. The DC brushless motor as claimed in claim 20, further comprising:
a base including the at least one pivotal portion, with the circuit board mounted to the base, with the first peripheral face being an outer peripheral face, with the annular insulating ring including an inner peripheral face, with a plurality of winding portions extending from each of the outer and inner peripheral faces, with the inner peripheral face surrounding the at least one pivotal portion, with an annular groove formed between the outer and inner peripheral faces and having an opening.

32. The DC brushless motor as claimed in claim 31, with said at least one positioning member located between two of the plurality of winding portions adjacent to each other.

33. The DC brushless motor as claimed in claim 31, with each of the plurality of winding portions including a rib and a stop plate, with each of the ribs located outside of the outer peripheral face including a first end interconnected to the outer peripheral face and a second end interconnected to one of the stop plates located outside of the outer peripheral face, with each of the ribs located inside of the inner peripheral face including a first end interconnected to the inner peripheral face and a second end interconnected to one of the stop plates located inside of the inner peripheral face, and with the coil unit wound around each of the ribs.

34. The DC brushless motor as claimed in claim 20, further comprising:
a base including the at least one pivotal portion, with the circuit board mounted to the base, with the first peripheral face being an inner peripheral face, with the annular insulating ring including an outer peripheral face.

35. The DC brushless motor as claimed in claim 34, with said at least one positioning member located between two of the plurality of winding portions adjacent to each other.

36. The DC brushless motor as claimed in claim 34, with the base coupled to a housing, with the circuit board, the stator, and the hub and the permanent magnet of the rotor received in the housing, and with the shaft of the rotor having an end extending beyond the housing.

37. The DC brushless motor as claimed in claim 20, with said at least one positioning member located between two of the plurality of winding portions adjacent to each other.

38. A stator for a DC brushless motor comprising:
- an annular insulating ring integrally formed from an insulating material, with the annular insulating ring including an outer peripheral face, an inner peripheral face and at least one positioning member, with a plurality of winding portions extending from at least one of the outer and inner peripheral faces, with said at least one positioning member being integrally formed on the outer peripheral face of the annular insulating ring as a single continuous monolithic piece, with said at least one positioning member being a post or a hook; and
- a coil unit wound around each of the plurality of winding portions.

39. The stator as claimed in claim 38, with the plurality of winding portions formed on the outer peripheral face.

40. The stator as claimed in claim 38, with the plurality of winding portions formed on the inner peripheral face.

41. The stator as claimed in claim 38, with the plurality of winding portions formed on both of the outer and inner peripheral faces.

42. The stator as claimed in claim 41, with the plurality of winding portions formed on the outer peripheral face aligned with the plurality of winding portions formed on the inner peripheral face.

43. The stator as claimed in claim 41, with the plurality of winding portions formed on the outer peripheral face misaligned with the plurality of winding portions formed on the inner peripheral face.

44. The stator as claimed in claim 38, further comprising: an annular groove formed between the outer and inner peripheral faces, and with the annular groove having an opening.

45. The stator as claimed in claim 38, with the coil unit wound around said at least one positioning member.

46. The stator as claimed in claim 45, with said at least one positioning member located between two of the plurality of winding portions adjacent to each other.

47. A stator for a DC brushless motor comprising:
- an annular insulating ring integrally formed from an insulating material, with the annular insulating ring including an outer peripheral face, an inner peripheral face and at least one positioning member, with a plurality of winding portions extending from at least one of the outer and inner peripheral faces, with said at least one positioning member including a plurality of hollow cylinders formed on the outer peripheral face of the annular insulating ring, with a pin engaged in each of the plurality of hollow cylinders; and
- a coil unit wound around each of the plurality of winding portions.

48. The stator as claimed in claim 47, with the plurality of winding portions formed on the outer peripheral face.

49. The stator as claimed in claim 47, with the plurality of winding portions formed on the inner peripheral face.

50. The stator as claimed in claim 47, with the plurality of winding portions formed on both of the outer and inner peripheral faces.

51. The stator as claimed in claim 50, with the plurality of winding portions formed on the outer peripheral face aligned with the plurality of winding portions formed on the inner peripheral face.

52. The stator as claimed in claim 50, with the plurality of winding portions formed on the outer peripheral face misaligned with the plurality of winding portions formed on the inner peripheral face.

53. The stator as claimed in claim 47, further comprising: an annular groove formed between the outer and inner peripheral faces, and with the annular groove having an opening.

54. The stator as claimed in claim 47, with the coil unit wound around said at least one positioning member.

55. The stator as claimed in claim 54, with said at least one positioning member located between two of the plurality of winding portions adjacent to each other.

\* \* \* \* \*